(12) United States Patent
Aoyama et al.

(10) Patent No.: US 8,316,353 B2
(45) Date of Patent: Nov. 20, 2012

(54) PROBLEM ANALYSIS VIA MATCHING CONTIGUOUS STACK TRACE LINES TO SYMPTOM RULES

(75) Inventors: Nozomu Aoyama, Kanagawa-ken (JP); Toshimichi Arima, Kanagawa-ken (JP); Kyoichi Ozaki, Tokyo (JP); Hiroyuki Shingai, Tokyo (JP); Masaaki Suehiro, Ibaraki-ken (JP)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 12/250,643

(22) Filed: Oct. 14, 2008

(65) Prior Publication Data
US 2010/0095157 A1    Apr. 15, 2010

(51) Int. Cl.
*G06F 9/44* (2006.01)
(52) U.S. Cl. ....................................................... 717/124
(58) Field of Classification Search .................... 717/124
See application file for complete search history.

(56) References Cited

U.S. PATENT DOCUMENTS
6,263,333 B1 * 7/2001 Houchin et al. ..................... 1/1

FOREIGN PATENT DOCUMENTS
JP      10-320241      12/1998

OTHER PUBLICATIONS

Mark Brodie et al., "Quickly Finding Known Software Problems via Automated Symptom Matching", IEEE International Converence on Autonomic Computing (ICAC), 2005.*

* cited by examiner

*Primary Examiner* — Chun-Kuan Lee
(74) *Attorney, Agent, or Firm* — Schmeiser, Olsen & Watts; John Pivnichny

(57) ABSTRACT

A method and system for analyzing a problem in a computing environment. Symptom rules that include associated problem information are generated in a symptom catalog. An input file including a stack trace provided in response to detecting the problem is received. Function names included in contiguous lines in the stack trace are identified. In response to a search for the function names in the symptom catalog, the function names found in the search are matched to keywords included in a symptom rule. The computing system retrieves problem information that corresponds to the matched keywords. A report is generated that includes the stack trace and a solution included in the retrieved problem information. The generated report uses a text attribute to emphasize the text of the function names included in the stack trace.

17 Claims, 21 Drawing Sheets

500

```
CRASH INFORMATION:
CPU 68 CSA F00000002FF47600 at time of crash, error code for LEDs: 70000000
pvthread+1814E00 STACK:
[0021C5D8]bmRecycle+0004A8 (0000000000000012, 00000000626D0000 [??])
[0021FDD4]bmAssign+0000FC (??, ??, ??, ??, ??)
[002409F8]xtSplitPage+000344 (??, ??, ??, ??, ??, ??, ??)
[00240F94]xtSplitUp+000188 (??, ??, ??, ??, ??, ??, ??)
[00248C38]xtInsert+0001F8 (??, ??, ??, ??, ??, ??, ??)
[002292AC]pagerAllocateExtent+000148 (??, ??, ??, ??, ??, ??, ??)
[00266228]pagerBackRange+0009B8 (??, ??, ??, ??, ??, ??)
[0018A390]vmfcopyin+0003B8 (??, ??, ??, ??, ??, ??, ??)
[001898A8]vm_uiomove+000690 (??, ??, ??, ??, ??)
[00269734]vmCopyIn+000018 (??, ??, ??)
[00229B58]pagerCopyIn+00006C (??, ??, ??)
[00251174]writeI+000480 (??, ??, ??, ??, ??, ??, ??)
[002500C4]j2_rdwr+0005DC (??, ??, ??, ??, ??, ??, ??)
[00396C9C]vnop_rdwr+0000FC (??, ??, ??, ??, ??, ??, ??)
[003CBBEC]vno_rw+000074 (??, ??, ??, ??, ??)
[0036BB20]fp_rwuio+0000B8 (??, ??, ??, ??)
[042D4BF4]aio.ext:rw_request+0000E8 (??, ??)
[042D4E50]aio.ext:do_requests+0000D8 (??)
[042D5188]aio.ext:server_main+000158 (??, ??, ??)
[00131234]procentry+000010 (??, ??, ??)
```

FIG. 5A

```
Call Trace:
([<0000000000018522>] show_stack+0xac/0xbc)
 [<0000000000018552>] dump_stack+0x22/0x30
 [<0000000000075482>] kmem_cache_destroy+0x122/0x214
 [<00000001008d6f2>] bio_set_exit+0x46/0xa4 [dm_mod]
 [<00000001086da44>] resize_pool+0x68/0x2dc [dm_mod]
 [<00000001086dd24>] dm_io_put+0x30/0x40 [dm_mod]
 [<00000001008c733a>] disk_dtr+0x42/0x78 [dm_rtmirror]
 [<00000001008c6a22>] dm_destroy_dirty_log+0x26/0x4c [dm_rtmirror]
 [<00000001008c282e>] rh_exit+0x126/0x154 [dm_rtmirror]
 [<00000001008c5082>] free_context+0x66/0x80 [dm_rtmirror]
 [<00000001008c5b24>] mirror_dtr+0x130/0x140 [dm_rtmirror]
 [<00000001008682d0>] table_destroy+0x84/0xfc [dm_mod]
 [<00000001008683c9>] dm_table_put+0x3c/0x4c [dm_mod]
 [<00000001008674054>] dm_put+0xf8/0x1fc [dm_mod]
 [<00000001008c1c0>] dev_wait+0x1cc/0x1e0 [dm_mod]
 [<00000001086d05e>] ctl_ioctl+0x2d6/0x330 [dm_mod]
 [<00000000000a9474>] sys_ioctl+0x3fc/0x468
 [<00000000002ff7e>] sysc_noemu+0x10/0x16
 [<0000002000001f08e2>] 0x2000001f08e2
```

[symptom]
logname=Bdump5.out
not_included_string=IY90396
current_stack_only=true
stack_scan_depth=7

CRASH INFORMATION:
CPU 68 CSA F00000002FF47600 at time of crash, error code for LEDs: 70000000
pvthread+1814E00 STACK:
[0021C5D8] bmRecycle+0004A8 (0000000000000012, 00000000626D0000 [??])
[0021FDD4] bmAssign+0000FC (??, ??, ??, ??, ??, ??)
[002409F8] xtSplitPage+000344 (??, ??, ??, ??, ??, ??)
[00240F94] xtSplitUp+000188 (??, ??, ??, ??, ??, ??)
[00248C38] xtInsert+0001F8 (??, ??, ??, ??, ??, ??, ??)
[002292AC] pagerAllocateExtent+000148 (??, ??, ??, ??, ??, ??)
[00266228] pagerBackRange+0009B8 (??, ??, ??, ??, ??, ??)
[0018A390] vmfcopyin+0003B8 (??, ??, ??, ??, ??, ??)
[001898A8] vm_uiomove+000690 (??, ??, ??)
[00269734] vmCopyIn+000018 (??, ??, ??)

```
[00229B58] pagerCopyIn+00006C (??, ??, ??)
[0025I174] writeI+000480 (??, ??, ??, ??, ??)
[002500C4] j2_rdwr+0005DC (??, ??, ??, ??, ??, ??, ??, ??)
[00396C9C] vnop_rdwr+0000FC (??, ??, ??, ??, ??, ??, ??, ??)
[003CBBEC] vno_rw+000074 (??, ??, ??, ??)
[0036BB20] fp_rwuio+0000B8 (??, ??, ??, ??)
[042D4BF4] aio.ext:rw_request+0000E8 (??, ??)
[042D4E50] aio.ext:do_requests+0000D8 (??)
[042D5188] aio.ext:server_main+000158 (??, ??, ??)
[00131234] procentry+000010 (??, ??, ??)
System_PTF_Level is following:
/usr/lib/objrepos:bos.mp64:5.3.0.0::APPLY:COMPLETE:05/09/05:15:36:10
```

FIG. 6B

```
[symptoms]
logname=Bdump5.out
current_stack_only=true
stack_scan_depth=6

SYSTEM STATUS:
release....2
version....5
build date Apr 10 2005
build time 20:10:45

CRASH INFORMATION:
CPU 0 CSA 01897A00 at time of crash, error code for LEDs: 700000000
pvthread+000200 STACK:
[03F16F28] hd_pin_bot:hd_begin+00007C (0000000000000000, 0000000000000000,
    F100010014CB8000 [??])
[03F1A4D4] hd_pin_bot:hd_parallel_write+0002A0 (??, ??, ??)
[03F17860] hd_pin_bot:hd_sched_queue+0001D8 (??, ??)
[03F28AE0] hd_pin_bot:hd_strategy+0000B0 (??)
[000E1D38] std_devstrat+000270 (??)
[000E20E4] devstrat@AF13_6+000058 (??)
[0011A370] v_pdtsio_common+000460 (??, ??, ??, ??, ??)
[0014C698] v_pfend+000388 (??)
[000DF9B4] internal_iodone_offl+0000B0 (??, ??)
[000DF8DC] iodone_offl+000068 ()
[000DD9DC] i_softmod+0001B8 ()
[000DD178] .finish_interrupt+000024 (??)
```

SYSTEM STATUS:
release.... 2
version.... 5
time of crash: Thu Aug 2 11:55:00 2007
age of system: 7 hr., 44 min., 4 sec.
xmalloc debug: enabled
Debug kernel error message: No debug cause was specified.

CRASH INFORMATION:
CPU 0 CSA 01897A00 at time of crash, error code for LEDs: 70000000
pvthread+000200 STACK:
[03F16F28] hd_pin_bot:hd_begin+00007C (0000000000000000, 0000000000000000,
    F100010014CB8000 [??])
[03F1A4D4] hd_pin_bot:hd_parallel_write+0002A0 (??, ??, ??)
[03F17860] hd_pin_bot:hd_sched_queue+0001D8 (??, ??)
[03F28AE0] hd_pin_bot:hd_strategy+0000B0 (??)
[000E1D38] std_devstrat+000270 (??) [000E20E4] devstrat@AF13_6+000058 (??)
[0011A370] v_pdtsio_common+000460 (??, ??, ??, ??, ??)
[0014C698] v_pfend+000388 (??) [000DF9B4] internal_iodone_off1+0000B0 (??, ??)
[000DF8DC] iodone_off1+000068 () [000DD9DC] i_softmod+0001B8 ()
[000DD178] .finish_interrupt+000024 (??)

[Solution]
Apply modification by PMR 12345, 678, 901.

*FIG. 8*

PROBLEM ANALYSIS VIA MATCHING CONTIGUOUS STACK TRACE LINES TO SYMPTOM RULES

FIELD OF THE INVENTION

The present invention relates to a data processing method and system for analyzing a problem associated with an information technology (IT) system, and more particularly to a technique for analyzing an IT defect by searching for a match between contiguous stack trace lines and symptom rules.

BACKGROUND OF THE INVENTION

In a conventional problem determination system supporting a technical service center, a stack trace records a history of function calls to a site where problems are detected. In the conventional system, an engineer manually inputs function names that are in the stack trace as single keyword searches of a problem database. The results of the searches are multiple problem reporting records that are manually reviewed by the engineer. During the review of the multiple problem reporting records, the engineer attempts to manually confirm a location of the function name in a problem reporting record and determines whether the problem reporting record identifies the detected problem. If the review of the multiple problem reporting records does not determine that a problem reporting record identifies the detected problem, the engineer can identify the detected problem as a new problem. The aforementioned manual steps lead to undesirable variations in the response speed of different engineers based on the engineers' varying skills and experience levels. Furthermore, engineers waste time in the conventional investigation of known problems in the problem database before being able to confirm that a problem is a new problem. Thus, there exists a need to overcome at least one of the preceding deficiencies and limitations of the related art.

SUMMARY OF THE INVENTION

The present invention provides a computer-implemented method of analyzing a problem in a computing environment. A computing system generates symptom rules in a symptom catalog that includes sets of information (a.k.a. problem information) about a set of problems. Each of the symptom rules includes a corresponding set of keywords. The symptom catalog associates the sets of keywords to the sets of problem information in a one-to-one correspondence. The computing system receives an input file that includes a stack trace provided in response to a detection of the problem. The computing system identifies a set of function names included in a set of contiguous lines in the stack trace. The symptom catalog is searched for the set of function names and in response, the set of function names is matched to a set of keywords. The computing system retrieves a set of problem information. The retrieved set of problem information corresponds to the matched set of keywords and includes a solution to the problem. The computing system generates a report that includes the stack trace and the solution. The generated report displays the set of function names included in the stack trace in a text having at least one attribute that emphasizes the text.

A system, computer program product, and process for supporting computing infrastructure corresponding to the above-summarized method are also described and claimed herein.

BRIEF DESCRIPTION OF THE DRAWINGS

FIG. 5A is an example of an Advanced Interactive eXecutive stack trace that is used as input to the system of FIG. 1A, in accordance with embodiments of the present invention.

FIG. 5B is an example of a Linux stack trace that is used as input to the system of FIG. 1A, in accordance with embodiments of the present invention.

FIGS. 6A-6B is an example of a record included in a component of FIG. 1B that is used in the process of FIG. 2B, in accordance with embodiments of the present invention.

FIG. 7 is an example of extracted symptom data used in the process of FIG. 2C, in accordance with embodiments of the present invention.

FIG. 8 is an example of a report that is output from the system of FIG. 1A, where the output indicates the symptom data portion of the input to the system of FIG. 1A, in accordance with embodiments of the present invention.

DETAILED DESCRIPTION OF THE DRAWINGS

Overview

The present invention provides a method and system for analyzing a problem in an autonomic problem determination computing environment that provides a stack trace in response to a detection of the problem. The analysis of the problem includes attempting to match function names in contiguous lines of the stack trace with keywords in predetermined symptom rules. Further, the present invention provides a technique for automatically generating a new symptom rule if no match is found between the function names in contiguous lines of the stack trace and the predetermined symptom rules. The system and method described herein provides an automatic and quick discrimination between problems that have symptoms already identified by predetermined symptom rules and new problems, thereby allowing service center engineers to waste less time investigating known problems and promoting the start of detailed analysis of new problems without delay. The automatic problem analysis in the present invention also minimizes the effect on response time related to variations in experience and skill levels of different service center engineers.

As used herein, a problem is defined as a crash in which a computer program stops performing its expected function and stops responding to other parts of a computing system. In one embodiment, a problem is a system crash, which is a sudden and drastic operating system failure in which the computer program that stops performing its expected function is a critical part of an operating system kernel.

Problem Analysis System

Figure 1A:
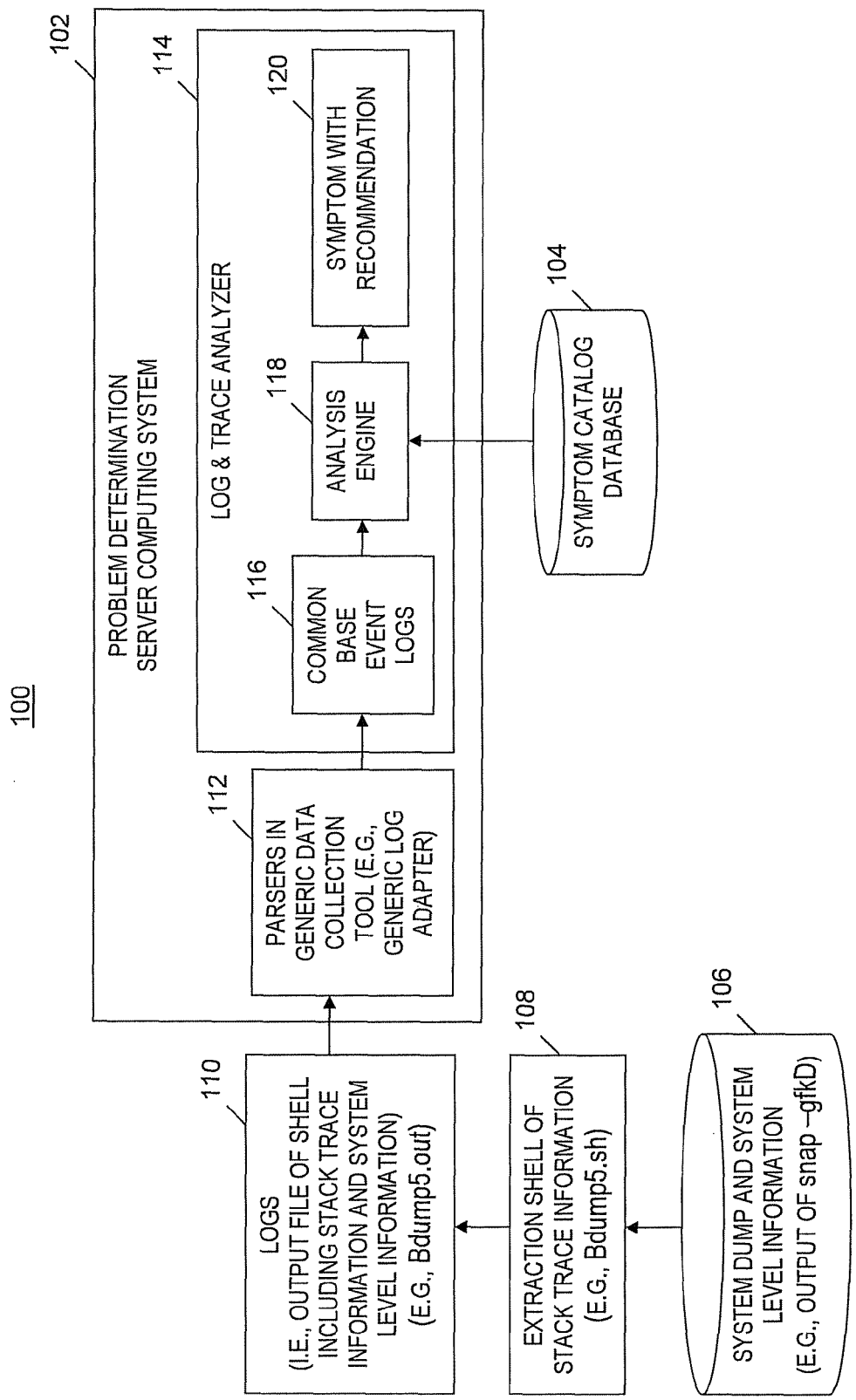
FIG. 1A is a block diagram of a problem analysis system based on a stack trace and symptom rules, in accordance with embodiments of the present invention.

FIG. 1A is a block diagram of a problem analysis system based on a stack trace and symptom rules, in accordance with embodiments of the present invention. System 100 includes a problem determination server computing system 102, a symptom catalog database 104 (a.k.a. symptom catalog), system dump and system level information 106, an extraction shell of stack trace information 108, and logs 110. Logs 110 are provided by an output file of extraction shell 108 that includes stack trace information and system level information. Symptom catalog 104 includes a plurality of symptom rules. The present invention uses the symptom rules to match keywords in the symptom rules with function names in contiguous lines of a stack trace included in logs 110.

System catalog database 104 resides on a computer data storage device coupled to computing system 102. System dump and system level information 106 resides on a computer storage device coupled to computing system 102 or to another computing system (not shown). Computing system 102 includes parsers 112 that are included in a generic data collection tool (e.g., a Generic Log Adapter (GLA) offered by International Business Machines Corporation located in Armonk, N.Y.) and a log and trace analyzer (LTA) 114. Parsers 112 may include, for example, GLA parsers that parse text in logs 110 from Advanced Interactive eXecutive (AIX®), DB2®, and/or WebSphere® Application Server (WAS) environments.

LTA 114 includes logs 116 and an analysis engine 118, and outputs a symptom with a recommendation 120. Parsers 112 parse heterogeneous logs 110 into logs 116 that are expressed in a common language of log files (e.g., the Common Base Event (CBE) specification provided by International Business Machines Corporation). Hereinafter, logs 116 are also referred to as Common Base Event logs or CBE logs.

Analysis engine 118 includes the logic for analyzing information about a stack trace in a CBE log 116 and determining whether any keywords in a symptom rule in symptom catalog database 104 matches function names in contiguous lines of text (a.k.a. contiguous lines) in the stack trace. In one embodiment, analysis engine 118 is an Active Correlation Technology (ACT) engine available from International Business Machines Corporation.

In one embodiment, an AIX® operating system provides system dump and system level information 106 via the output of a snap command. AIX® is an operating system offered by International Business Machines Corporation. For example, a snap command with the parameters –gfkD provides output of an lslpp command (i.e., displays the overall version of a software package and general system information), file system information, kernel information, and dump information. Further, the extraction shell 108 is the AIX® Bdump5.sh file and logs 110 are provided in the AIX® Bdump5.out file.

Additional details about the functionality of the components of system 100 are included in the discussions below relative to FIGS. 2A-2C, 3A-3F, and 4A-4C.

Figure 1B:
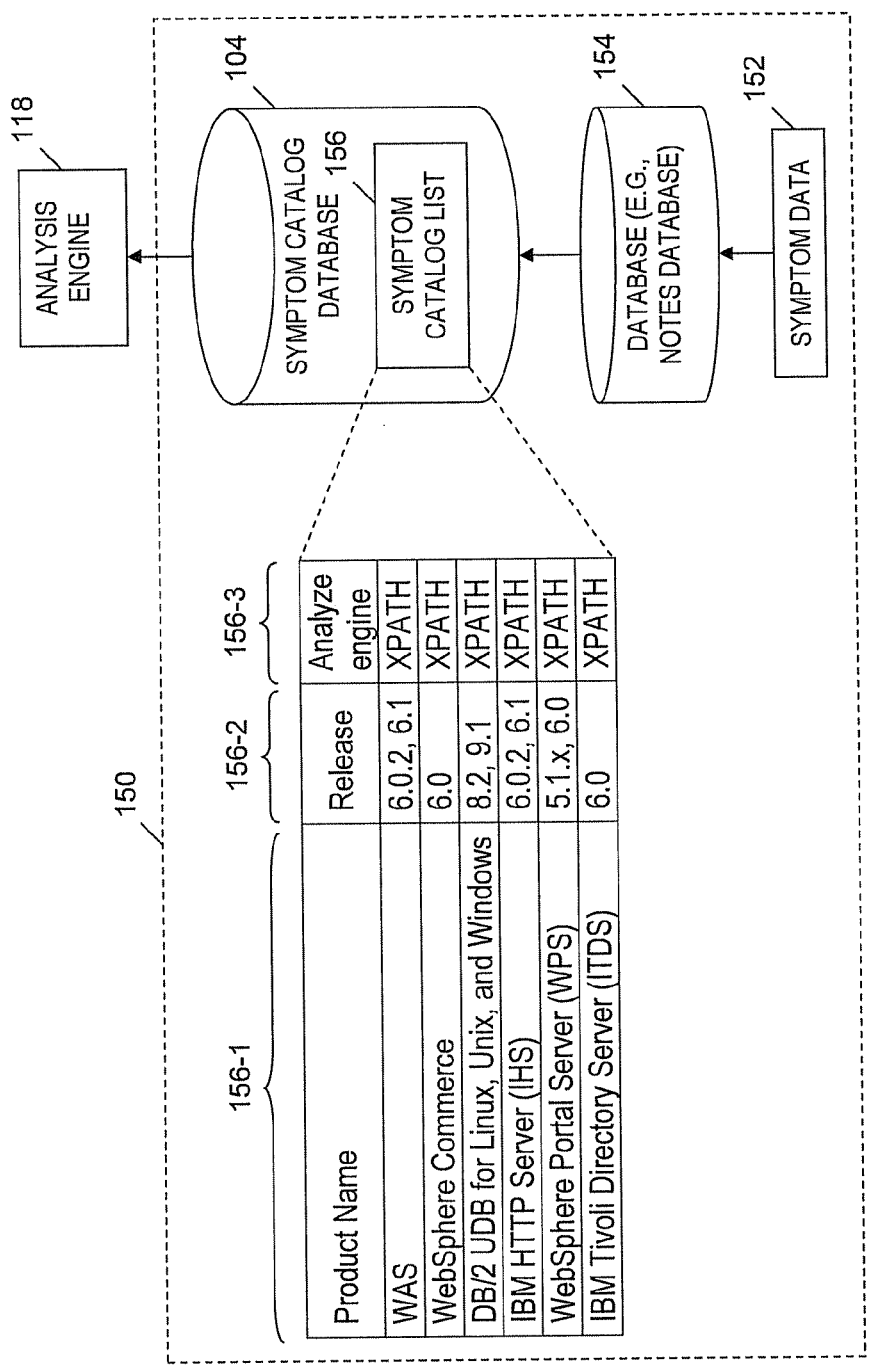
FIG. 1B is a block diagram of symptom generator components that provide symptom rules to the system of FIG. 1A, in accordance with embodiments of the present invention.

FIG. 1B is a block diagram of symptom generator components that provide symptom rules to the system of FIG. 1A, in accordance with embodiments of the present invention. Symptom generator 150 includes symptom data 152, a database 154 (e.g., a Lotus® Notes® database), and symptom catalog database 104. Symptom catalog database includes symptom catalog list 156 that includes single event symptoms. Each record in symptom catalog list 156 includes, for example, a product name 156-1, a release number 156-2 (e.g., a release and version number of AIX®), and an analyze engine 156-3.

Symptom data 152 that indicate a cause of a problem (e.g., a system halt) in a computing environment is stored in database 154. Symptom rules are extracted from database 154 and stored in symptom catalog database 104. Analysis engine 118 retrieves symptom rules from symptom catalog database 104 to determine whether function names in contiguous lines of a stack trace match function names included in a symptom rule. Further details regarding the functionality of components of FIG. 1B are described below relative to FIG. 2B and FIGS. 4A-4C.

Problem Analysis Processes

Figure 2A:
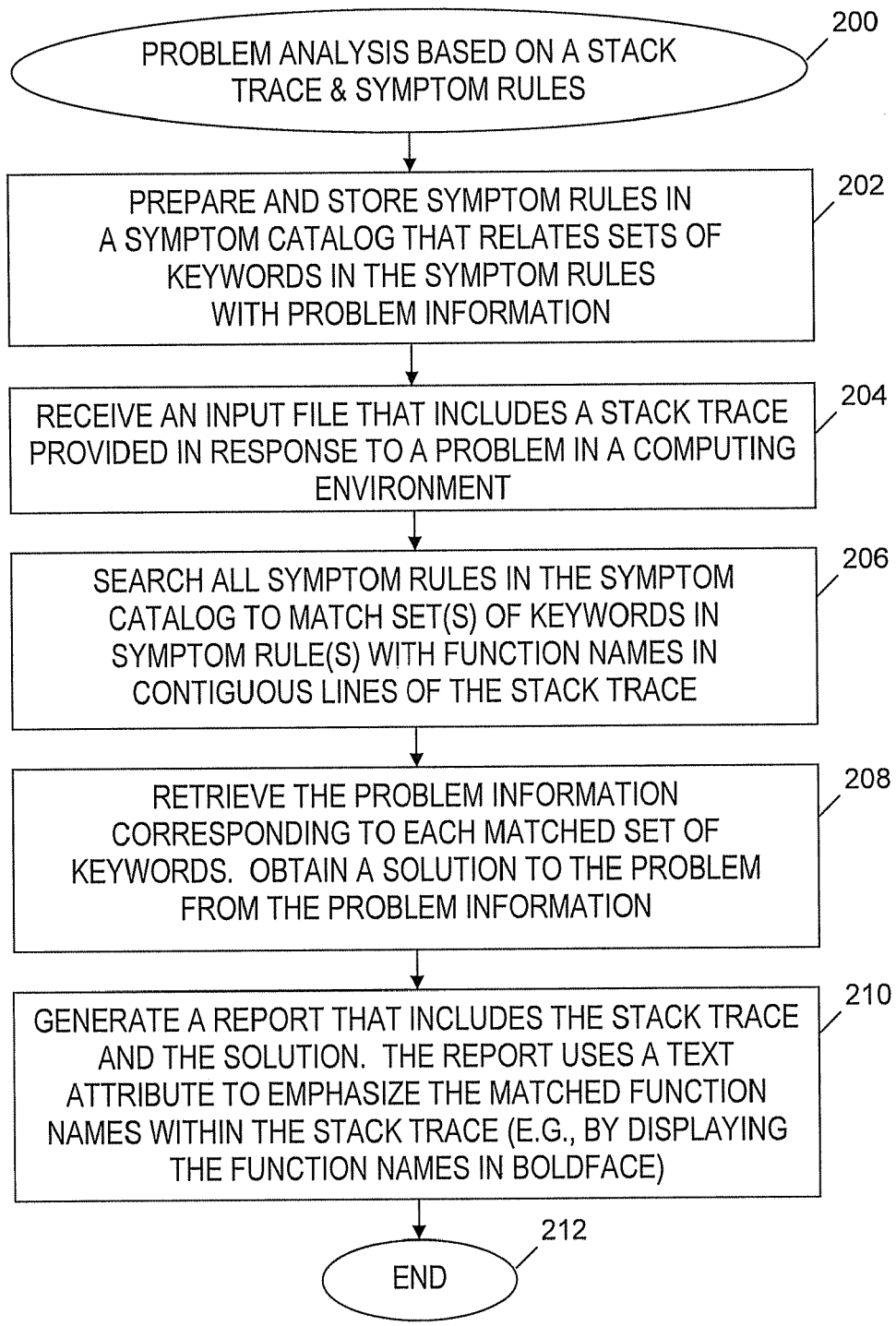
FIG. 2A is a flowchart of a process for analyzing problems based on a stack trace and symptom rules in the system of FIG. 1A, in accordance with embodiments of the present invention.

FIG. 2A is a flowchart of a process for analyzing problems based on a stack trace and symptom rules in the system of FIG. 1A, in accordance with embodiments of the present invention. The problem analysis process starts at step 200. In step 202, computing system 102 (see FIG. 1A) generates and stores symptom rules in symptom catalog 104 (see FIG. 1A). A symptom rule includes a set of keywords that specifies a symptom that identifies a problem (e.g., a system halt) experienced by a computing environment. Hereinafter, a problem identified by a symptom specified by the set of keywords in a symptom rule is referred to as the problem associated with the symptom rule. Symptom catalog 104 (see FIG. 1A) relates the sets of keywords included in the symptom rules included therein with corresponding problem information. Problem information corresponding to a symptom rule via the symptom catalog 104 (see FIG. 1A) includes a recommended solution to the problem associated with the symptom rule.

In step 204, computing system 102 (see FIG. 1A) receives an input file that includes a stack trace. The stack trace is provided in response to a computing system detecting a problem experienced by a computing environment. Hereinafter in this section, the detected problem that results in the stack trace is referred to simply as "the problem." The input file received in step 204 may be a log included in logs 110 (see FIG. 1A) that includes a stack trace and system level information. Hereinafter, in this section, the stack trace included in the input file received in step 204 is referred to simply as "the stack trace." The input file may be derived from extraction shell 108 (see FIG. 1A), which is derived from system dump and system level information 106 (see FIG. 1A). The input file received in step 204 is parsed by a parser included in parsers 112 (see FIG. 1A), which results in a log included in CBE logs 116 (see FIG. 1A).

In step 206, analysis engine 118 (see FIG. 1A) reads and searches the plurality of symptom rules of symptom catalog 104 (see FIG. 1A) and performs the following analysis: for each symptom rule searched, analysis engine 118 (see FIG. 1A) analyzes sets of function names in sets of contiguous lines of the stack trace to identify a match between a set of function names in contiguous lines of the stack trace and a set of keywords in the symptom rule being searched. To perform the analysis in step 206, the analysis engine 118 (see FIG. 1A) identifies the set of keywords in the symptom rule by identifying a tag included in each keyword. In one embodiment, the tag identifying each keyword in a symptom rule is a tag that indicates a boldface type attribute. Step 206 may result in one or more sets of keywords in one or more symptom rules being matched to a set function names in contiguous lines of the stack trace.

In step 208, analysis engine 118 (see FIG. 1A) retrieves problem information from symptom catalog 104 (see FIG. 1A), which associates the problem information with the symptom rule(s) whose set(s) of keywords were matched in step 206. Also in step 208, using predefined criteria, analysis engine 118 (see FIG. 1A) or a manual process obtains a recommended action (i.e., a solution) to solve the problem. The solution to the problem is obtained from the problem information retrieved in step 208.

In step 210, analysis engine 118 (see FIG. 1A) generates a report that includes the stack trace and the solution obtained in step 208. The report generated in step 210 is presented, for example, on a display device coupled to a computing system (e.g., computing system 102 of FIG. 1A). Analysis engine 118 (see FIG. 1A) associates at least one predefined attribute (e.g., text attribute) with the set of function names matched in step 206, so that the set of function names is emphasized in the report and is distinguished from a substantial portion of the report that does not include the set of function names. In one embodiment, the at least one attribute associated with the set of function names includes a boldface text attribute. In other embodiments, the at least one attribute may include the boldface text attribute and/or any combination of the following attributes: a predefined font, italics, a predefined font width, a predefined font color, a predefined typeface, a predefined typeface size, a predefined background color, underlining, and double underlining. In still other embodiments, the set of function names may be emphasized in the report by using a line or other graphic to outline or otherwise indicate the function names. In step 212, the process of FIG. 2A ends.

Figure 2B:
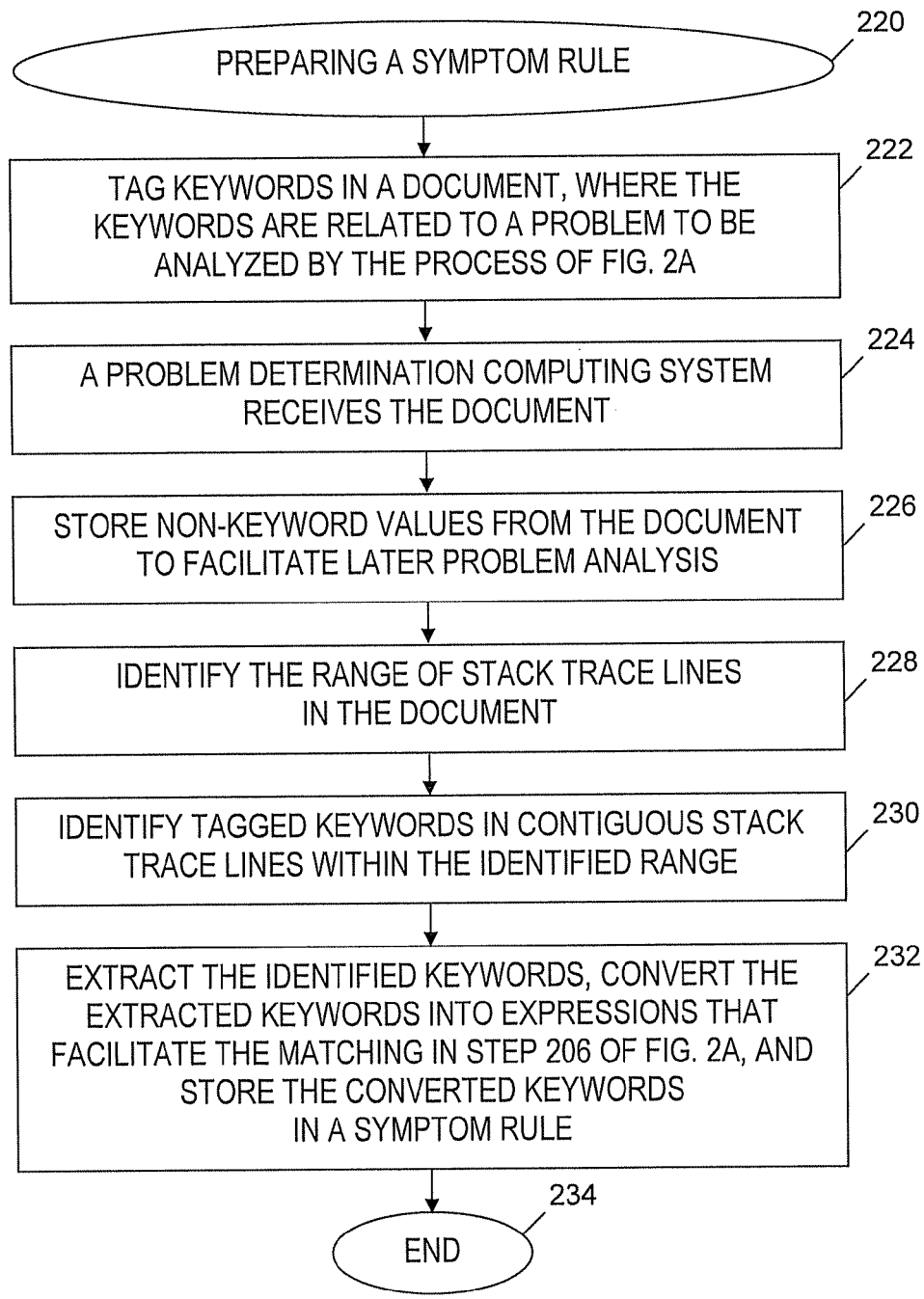
FIG. 2B is a flowchart of a process for preparing a symptom rule in the process of FIG. 2A, in accordance with embodiments of the present invention.

FIG. 2B is a flowchart of a process for preparing a symptom rule in the process of FIG. 2A, in accordance with embodiments of the present invention. The symptom rule preparation process begins at step 220. In step 222, computing system 102 (see FIG. 1A) or a manual process tags keywords in a document. The document is in a markup language format that permits tagging (e.g., Rich Text Format). In one embodiment, the tagging in step 222 tags the keywords with indicators of boldface type. The keywords tagged in step 222 specify a symptom of a problem to be analyzed by the process of FIG. 2A. In one embodiment, the document whose keywords are tagged in step 222 is a human readable knowledge document.

In step 224, computing system 102 (see FIG. 1A) receives the document whose keywords are tagged in step 222 and retrieves a portion of the document that describes a symptom of the problem to be analyzed.

In step 226, computing system 102 (see FIG. 1A) stores non-keyword values from the document received in step 224. The non-keyword values stored in step 226 facilitate a problem analysis performed by the process of FIG. 2A, where the problem analysis is attempting to match function names in contiguous lines of a stack trace to keywords in the symptom rule generated by the process of FIG. 2B. Hereinafter in the description of FIG. 2B, the symptom rule generated by the process of FIG. 2B is referred to simply as "this symptom rule." The non-keyword values stored in step 226 include, for example, (1) character strings (and the number of character strings) that are not to be included in the analysis of function names in step 206 (see FIG. 2A) as the function names are compared to keywords in this symptom rule; (2) an indication (e.g., a Boolean value) of whether the analysis of FIG. 2A for this symptom rule is performed only on a current stack trace or whether the analysis of FIG. 2A is also performed on one or more additional stack traces; and (3) a stack scan depth value that indicates an ordinal position of a last line within the stack trace that is permitted to be analyzed in step 206 (see FIG. 2A) for this symptom rule (i.e., no stack trace lines in ordinal positions greater than the stack scan depth value are permitted to be analyzed in step 206 of FIG. 2A) for this symptom rule. The non-keyword values are stored in a computer data storage device coupled to computing system 102 (see FIG. 1A) or to another computing system.

In one embodiment, a system having multiple CPUs provides the current stack trace and one or more other stack traces (i.e., each CPU is associated with a corresponding stack trace) and step 226 stores the indication that the analysis of FIG. 2A is to be performed on the current stack trace and the one or more other stack traces. For example, in a 64 CPU system configuration, there are 64 stack traces in the input file (e.g., Bdump5.out provided by an AIX® operating system) to computing system 102 (see FIG. 1A). In the example of a 64 CPU system configuration and the problem being analyzed is a system crash (e.g., LED code is 300 or 700), only the first stack trace in the input file needs to be checked and the other 63 stack traces may be ignored to avoid an incorrect matching of a symptom rule to contiguous stack trace lines.

In step 228, computing system 102 (see FIG. 1A) identifies the range of lines in the stack trace (a.k.a. stack trace range) that are to be analyzed in step 206 (see FIG. 2A), and stores the number of lines in the stack trace range. The number of lines in the stack trace range are stored in a computer data storage device coupled to computing system 102 (see FIG. 1A) or to another computing system.

Following step 228, computing system 102 (see FIG. 1A) optionally searches for character strings in lines in the document received in step 224 that include a predefined tag, but that are not included in the stack trace range. For example, the computing system searches for boldface character strings in the non-stack trace range lines of the document received in step 224. If any character strings are found in the search in step 228, the strings are stored in a computer data storage device coupled to computing system 102 (see FIG. 1A) or to another computing system.

In step 230, computing system 102 (see FIG. 1A) identifies keywords in contiguous lines within the identified stack trace range that are tagged with the predefined tag (e.g., a tag indicating boldface type).

In step 232, computing system 102 (see FIG. 1A) extracts the keywords identified in step 230, converts the extracted keywords into expressions (e.g., JavaScript® expressions) that facilitate the analysis of step 206 (see FIG. 2A), and stores the converted keywords in a symptom rule in symptom catalog 104 (see FIG. 1A). The process of FIG. 2B ends at step 234.

Figure 2C:
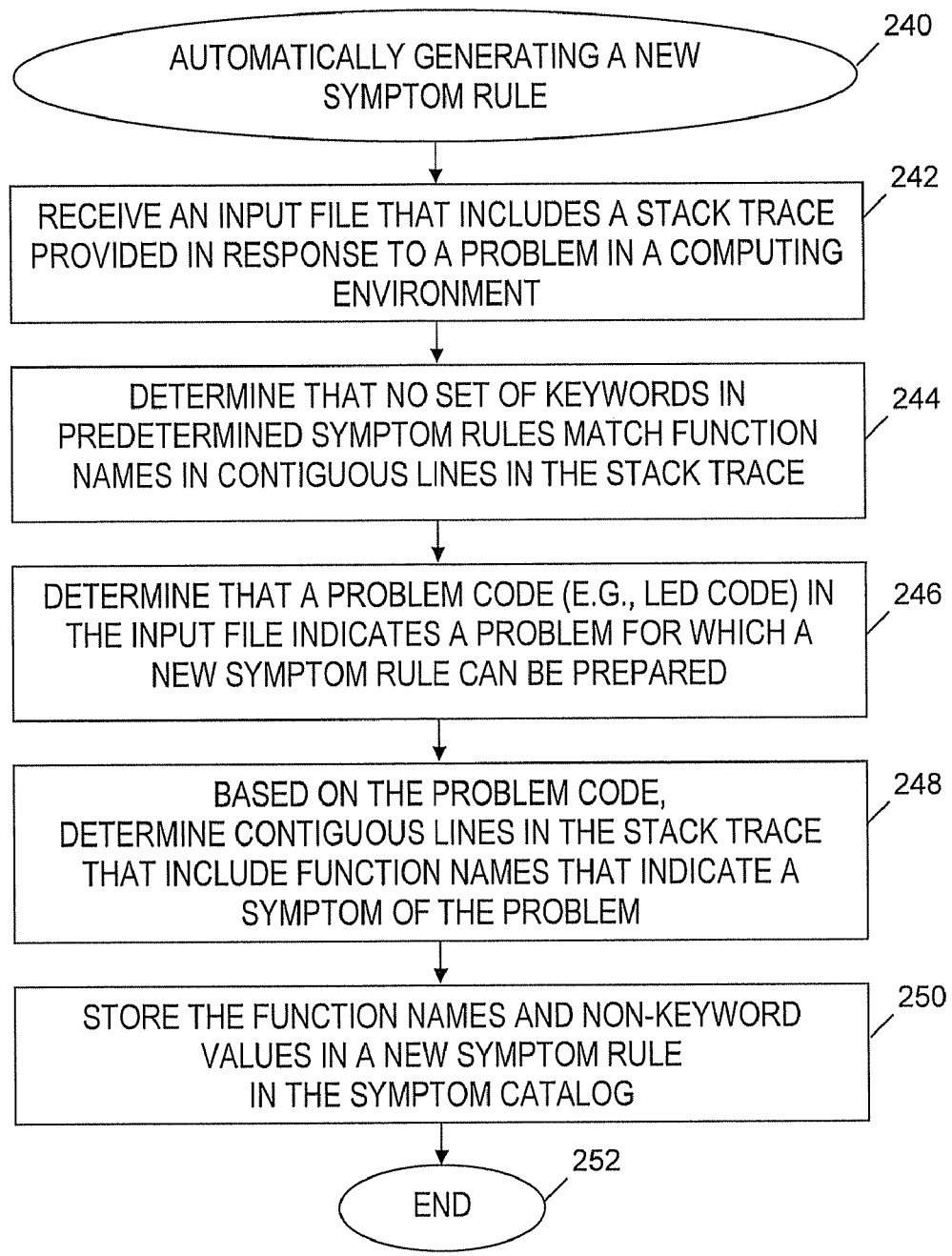
FIG. 2C is a flowchart of a process for automatically generating a new symptom rule in the system of FIG. 1A, in accordance with embodiments of the present invention.

FIG. 2C is a flowchart of a process for automatically generating a new symptom rule in the system of FIG. 1A, in accordance with embodiments of the present invention. The automatic new symptom rule generation process begins at step 240. In step 242, computing system 102 (see FIG. 1A) receives an input file that includes a stack trace provided in response to a problem being detected in a computing environment. Hereinafter in the discussion of FIG. 2C, the stack trace included in the input file received in step 242 is referred to simply as "the stack trace" and the problem detected in the computing environment is referred to as "the problem." In step 244, analysis engine 118 (see FIG. 1A) determines that no set of keywords in predetermined symptom rules stored in symptom catalog 104 (see FIG. 1A) match function names in contiguous lines of the stack trace.

In step 246, analysis engine 118 (see FIG. 1A) determines that a problem code in the input file received in step 242 indicates that a new symptom rule can be generated for the problem according to predefined criteria. For example, detecting the existence of a light-emitting diode (LED) code in an input file resulting from an AIX® system dump makes the determination in step 246 that a new symptom rule can be generated for the problem.

In step 248, based on the problem code determined in step 246, analysis engine 118 (see FIG. 1A) determines contiguous lines of text in the stack trace, where the contiguous lines include function names that indicate a symptom of the problem. The symptom indicated by the function names included in the contiguous lines determined in step 248 is not currently specified by one of the predetermined symptom rules in symptom catalog 104 (see FIG. 1A). In step 250, analysis engine 118 (see FIG. 1A) stores the function names indicating the symptom in a new symptom rule in symptom catalog 104 (see FIG. 1A). Step 250 may also include analysis engine 118 (see FIG. 1A) storing one or more non-keyword values in the new symptom rule. See the discussion above relative to step 226 of FIG. 2B for examples of non-keyword values. The process of FIG. 2C ends at step 252.

EXAMPLES

FIGS. 3A-3F depict a flowchart of a problem analysis and symptom extraction process that is an example of the processes of FIGS. 2A and 2C, in accordance with embodiments of the present invention. The exemplary problem analysis and symptom extraction process begins at step 300 of FIG. 3A. In step 302, computing system 102 (see FIG. 1A) receives file Bdump5.out as input. Bdump5.out includes a stack trace, information about the stack trace and system level information. Bdump5.out is output from an extraction shell of stack trace information 108 (see FIG. 1A) (i.e., Bdump5.sh) that was derived from a set of AIX® system dump and system level information 106 (see FIG. 1A).

Unless otherwise indicated the following steps in FIGS. 3A-3F are performed by analysis engine 118 (see FIG. 1A). In step 304, a counter (i.e., StackCnt) indicating a particular stack trace is initialized to zero. In step 306, a range of the current (i.e., (StackCnt+1)-th) stack trace is identified and the number of lines of text in the identified range is stored in line_count.

In step 308, a counter (i.e., SymCnt) indicating a particular symptom rule is initialized to zero. In step 310, the current (i.e., (SymCnt+1)-th) symptom rule is read and SymCnt is incremented by one. If step 312 determines that the release number and version number in the current symptom rule coincide (i.e., match) the AIX® release number and AIX® version number, respectively, in Bdump5.out, then the process of FIGS. 3A-3F continues with step 314; otherwise, the next step is step 332 of FIG. 3C. In step 314, the location and length of the column in which the AIX® release number is described in Bdump5.out is stored into BoldCol[1] and BoldLen[1], respectively. The location and length of the column in which the version number is described in Bdump5.out is stored into BoldCol[2] and BoldLen[2], respectively. A counter (i.e., BoldCnt) for keywords to be later displayed in boldface is set to the value of two.

After the completion of step 314, the exemplary problem analysis process continues with step 316. If step 316 of FIG. 3B determines that no NotIncludedStringCnt NotIncludedString[ ] exists in Bdump5.out, then the next step is step 318; otherwise, the next step is step 332 of FIG. 3C. NotIncludedString[ ] is a non-keyword value that is stored during a preparation of the current symptom rule that precedes the beginning of the exemplary problem analysis process of FIGS. 3A-3F (see, e.g., step 406 of FIG. 4A). NotIncludedString[ ] includes any character strings that were determined (prior to the start of the process of FIGS. 3A-3F) to be not included in the analysis of function names in step 206 (see FIG. 2A). NotIncludedStringCnt is a counter indicating a character string in NotIncludedString[ ].

In step 318, the location and length of the column in which KeyWord[n] is described in Bdump5.out is stored into BoldCol[n+BoldCnt] and BoldLen[n+BoldCnt], respectively. When all of the locations and lengths of keywords in KeyWord[ ] are stored into BoldCol[ ] and BoldLen[ ], respectively, BoldCnt is set to KeyWordCnt+BoldCnt. The initial storage of values in KeyWord[ ] and KeyWordCnt are performed in a process of preparing the current symptom rule (see, e.g., step 414 of FIG. 4A).

Figure 3A:
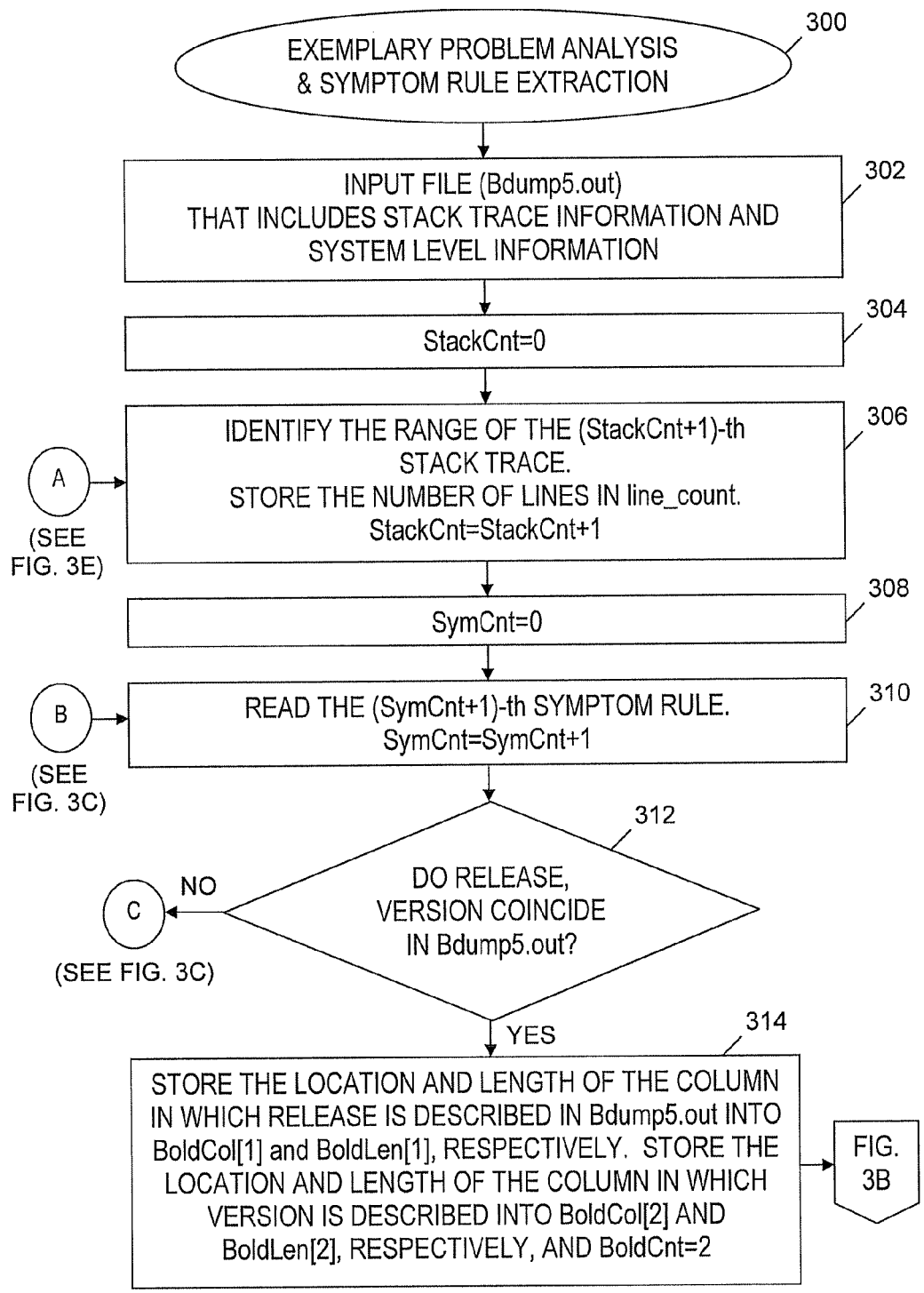
FIGS. 3A-3F depict a flowchart of a problem analysis and symptom extraction process that is an example of the processes of FIGS. 2A and 2C, in accordance with embodiments of the present invention.
Figure 3B:
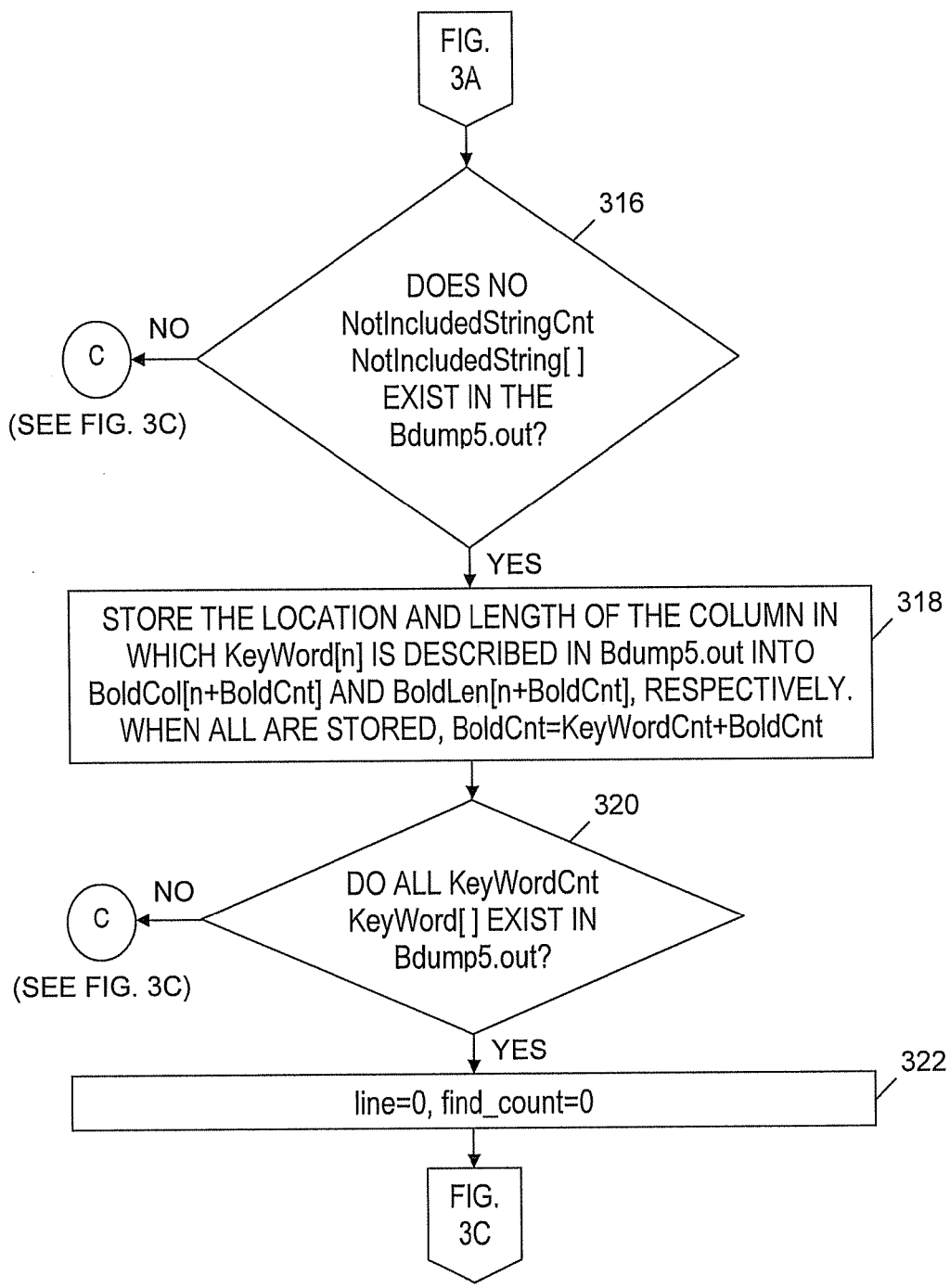
Figure 3C:
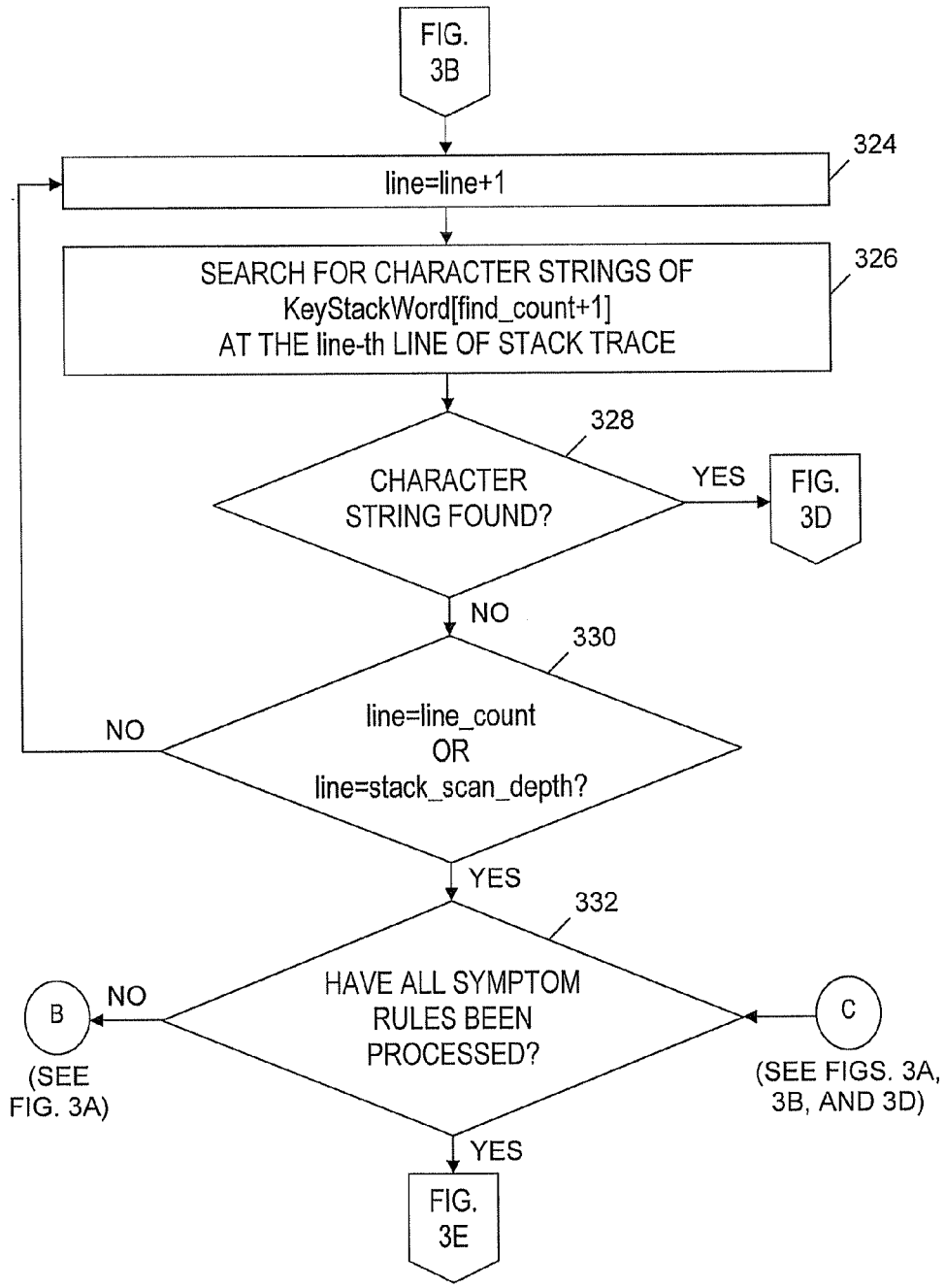

If step 320 determines that all values KeyWordCnt KeyWord[ ] exist in Bdump5.out, then the next step is step 322; otherwise, the next step is step 332 of FIG. 3C. In step 322, a current line (i.e., line) of the stack trace and a counter (i.e., find_count) indicating a particular value in KeyStackWord[ ] are initialized to zero. KeyStackWord[ ] includes keywords of the current symptom rule. KeyStackWord[ ] is populated during a process of preparing the current symptom rule (see, e.g., step 432 of FIG. 4C).

After step 322, the process continues with step 324 of FIG. 3C. In step 324, the value of line is incremented by one. In step 326, character strings of KeyStackWord[find_count+1] are searched for at the line-th line of the current stack trace. If step 328 determines that a character string is found in the search performed in step 326, then the next step is step 334 of FIG. 3D; otherwise, the next step is step 330. If step 330 determines that line is equal to line_count or line is equal to stack_scan_depth, then the next step is step 332; otherwise (i.e., line is not equal to line_count and line is not equal to stack_scan_depth), the exemplary problem analysis process of FIGS. 3A-3F repeats starting at step 324 with an increment of line. The value of stack_scan_depth is initialized during a process of preparing the current symptom rule and prior to the start of the process of FIGS. 3A-3F (see, e.g., step 410 of FIG. 4A).

Figure 3D:
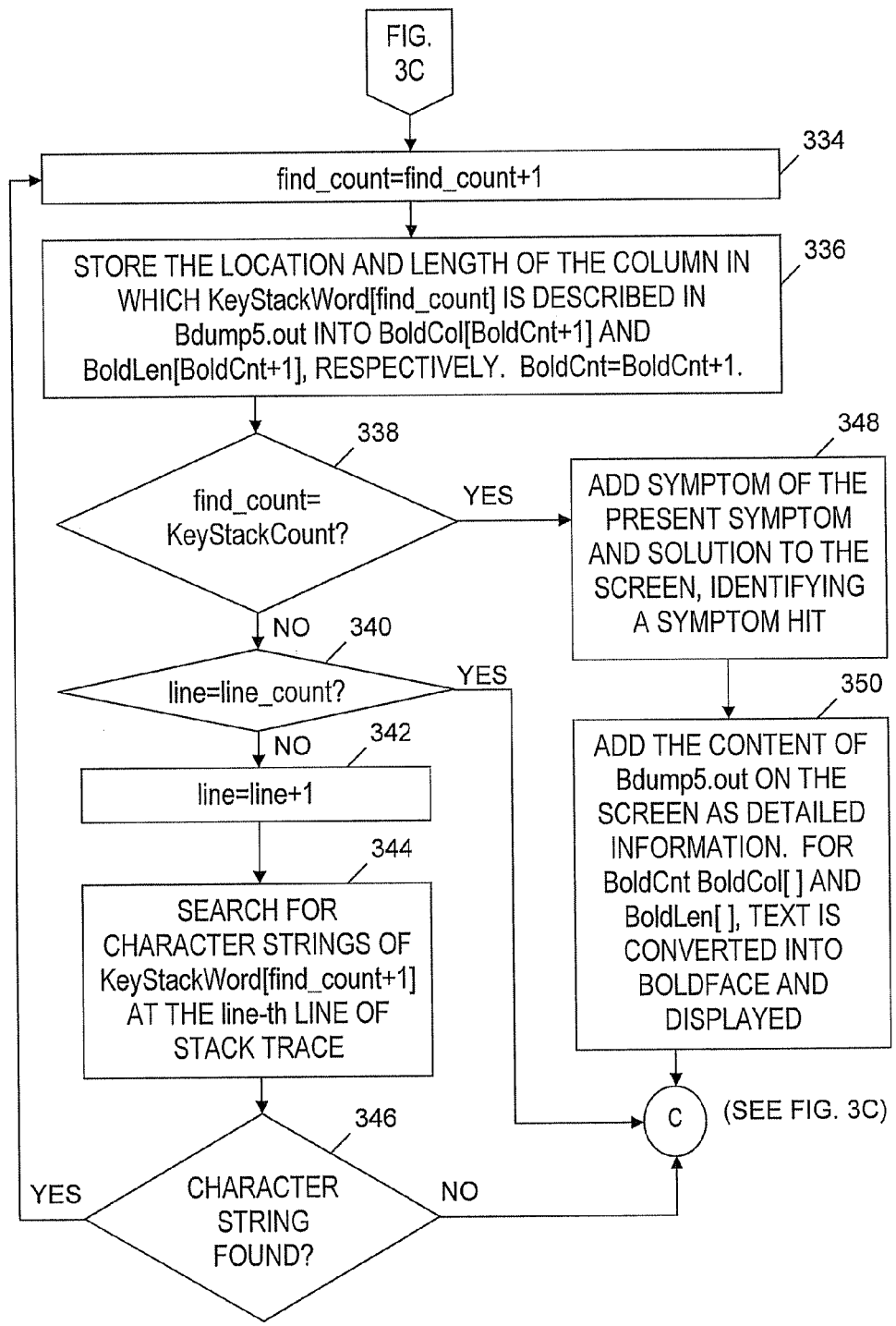
Figure 3E:
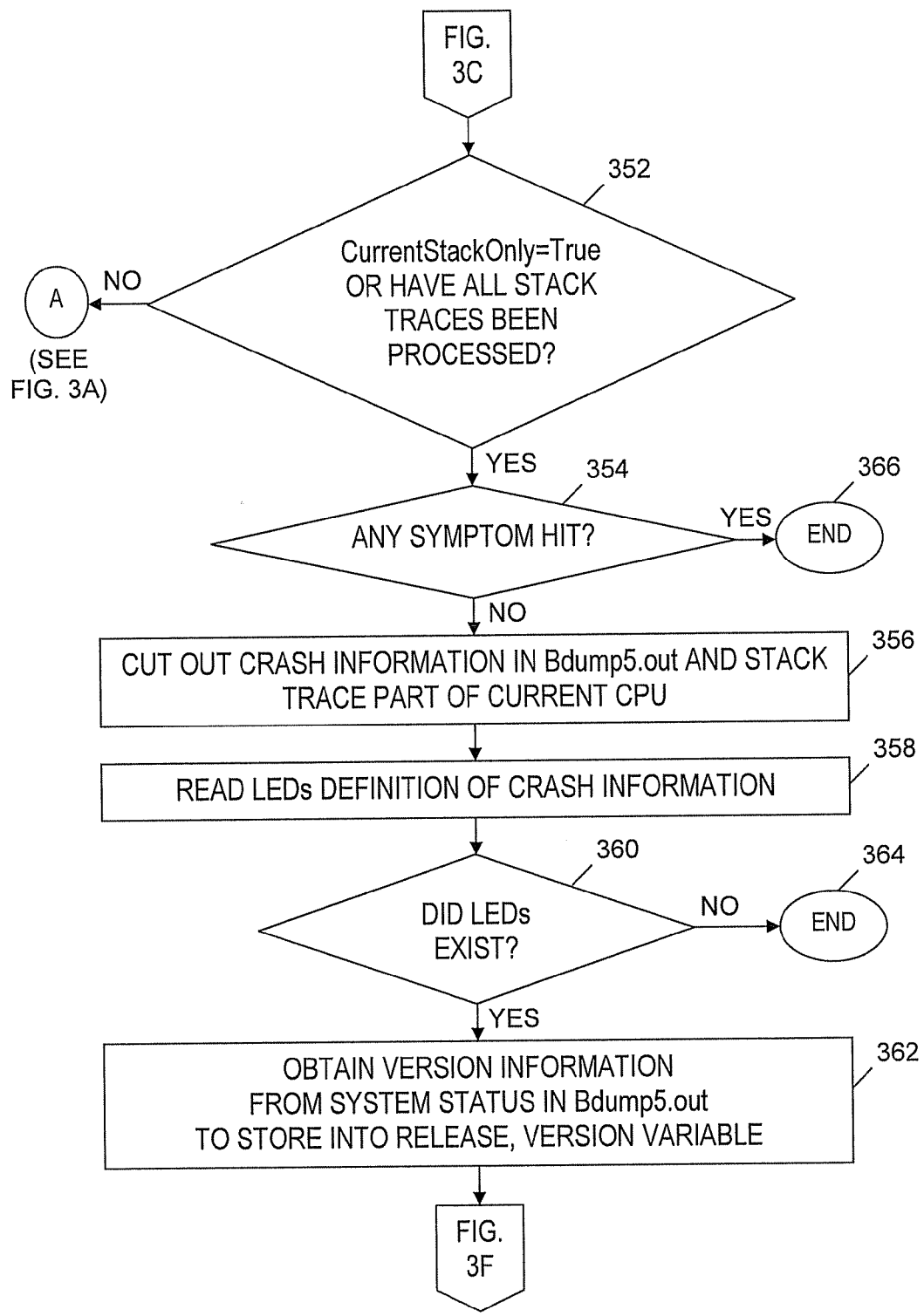

If step 332 determines that the plurality of symptom rules in symptom catalog 104 (see FIG. 1A) have been processed by the exemplary problem analysis process of FIGS. 3A-3F, then the next step is step 352 of FIG. 3E; otherwise, the exemplary problem analysis process of FIGS. 3A-3F repeats starting at step 310 of FIG. 3A (i.e., the next symptom rule is read).

As noted above, step 334 of FIG. 3D follows the determination in step 328 (see FIG. 3C) that a character string is found by the search performed in step 326 (see FIG. 3C). In step 334, find_count is incremented by one. In step 336, the location and length of the column in which KeyStackWord[find_count] is described in Bdump5.out is stored into BoldCol[BoldCnt+1] and BoldLen[BoldCnt+1], respectively, and BoldCnt is incremented by one.

In step 338, find_count is compared to KeyStackCount. KeyStackCount is a counter that indicates a particular keyword of KeyStackWord[ ]. KeyStackCount is initialized and updated in a process of preparing the current symptom rule that precedes the start of the exemplary problem analysis process of FIGS. 3A-3F (see, e.g., step 418 of FIG. 4B and step 430 of FIG. 4C). If find_count is not equal to KeyStackCount in step 338, then the next step is step 340; otherwise, the next step is step 348. In step 340, line is compared to line_count. If line is not equal to line_count in step 340, then the next step is step 342; otherwise, the exemplary problem analysis process of FIGS. 3A-3F repeats starting at step 332 (see FIG. 3C) (i.e., the analysis engine checks if the plurality of symptom rules in the symptom catalog have been processed).

In step 342, line is incremented by one to indicate the next line in the current stack trace. In step 344, character strings of KeyStackWord[find_count+1] are searched for at the line-th line of the current stack trace. That is, after step 328 (see FIG. 3C) found a match of one keyword in the current symptom rule with one character string (e.g., a function name) in a line of the current stack trace, the analysis engine continues to attempt to match all the keywords in the current symptom rule with character strings (e.g., function names) in contiguous lines of the current stack trace by searching the next line of the current stack trace for the next keyword of the current symptom rule.

If a character string being searched for in step 344 is found in step 346, then the exemplary problem analysis process of FIGS. 3A-3F repeats starting at step 334 (i.e., find_count is incremented); otherwise, the exemplary problem analysis process repeats starting at step 332 (see FIG. 3C) (i.e., the analysis engine checks if the plurality of symptom rules of the symptom catalog have been processed).

As noted above, step 348 follows the determination in step 338 that find_count equals KeyStackCount. In step 348, a symptom of the current symptom rule and a solution to the problem are added to a report displayed on a display device. In step 350, the content of Bdump5.out, including the stack trace(s) processed by the exemplary problem analysis, is added to the report displayed on the display device. Also in step 350, the text in Bdump5.out that is indicated by BoldCnt BoldCol[ ] and BoldLen[ ] is converted into boldface and displayed as boldface type in the report. The converted boldface text includes the function names in the stack trace(s) that matched keywords in a symptom rule of symptom catalog 104 (see FIG. 1A).

As noted above, step 352 of FIG. 3E follows the determination in step 332 (see FIG. 3C) that the plurality of symptom rules in the symptom catalog 104 (see FIG. 1A) have been processed by the exemplary problem analysis of FIGS. 3A-3F. If CurrentStackOnly has a value of True or if all stack traces have been processed (i.e., all stack traces provided by the system in response to a detection of the problem), then the next step is step 354; otherwise, the exemplary problem analysis process of FIGS. 3A-3F repeats starting at step 306 (see FIG. 3A). The value of CurrentStackOnly is set to True or False in a process of preparing the current symptom rule that precedes the start of the process of FIGS. 3A-3F (see, e.g., step 408 of FIG. 4A).

If step 354 determines that no matches (i.e., symptom hits) between keywords in a symptom rule and character strings (e.g., function names) in contiguous lines of a stack trace have been found by the process of FIGS. 3A-3F, then a new symptom rule needs to be generated and the next step is step 356. The new symptom rule needs to include keywords that specify a symptom of the problem being analyzed. In step 356, computing system 102 (see FIG. 1A) retrieves crash information from Bdump5.out and a stack trace part of a current central processing unit. In step 358, computing system 102 (see FIG. 1A) reads a LEDs definition of the retrieved crash information. In step 360, computing system 102 (see FIG. 1A) determines whether or not an LED code exists in the retrieved crash information. If the LED code exists according to the determination in step 360, then in step 362, computing system 102 (see FIG. 1A) obtains information (i.e., version information) about a version of software from system status information in Bdump5.out. Also in step 362, computing system 102 (see FIG. 1A) stores the version information in a release, version variable (i.e., a variable that stores the release and version numbers of the AIX® operating system that provided Bdump5.out).

Returning to step 354, if no symptom hit is detected, then the process of FIGS. 3A-3F ends at step 366. Returning to step 360, if the computing system 102 (see FIG. 1A) detects no LED code in the retrieved crash information, then the process of FIGS. 3A-3F ends at step 364.

Figure 3F:
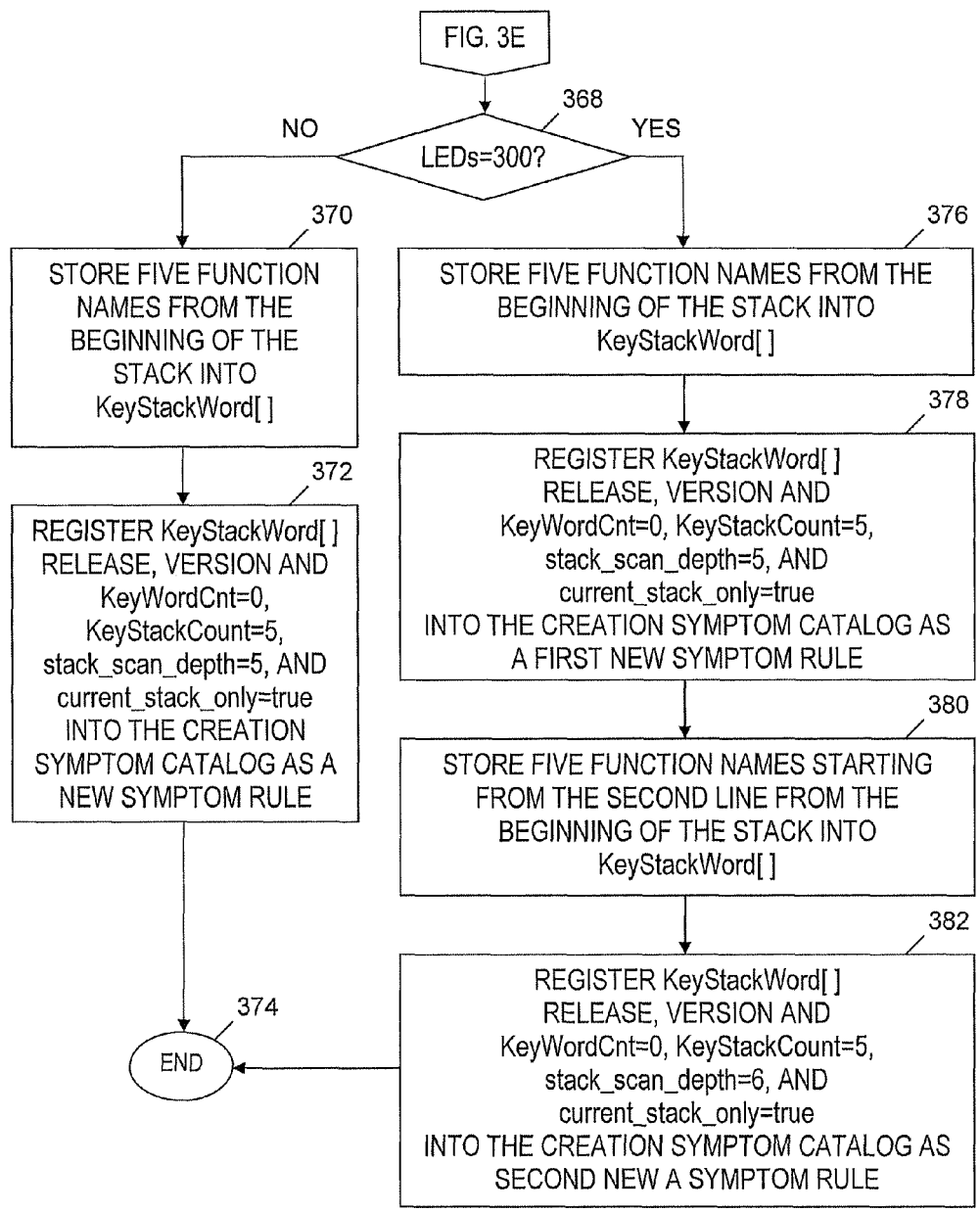

After step 362 is completed, step 368 in FIG. 3F is performed. In step 368, computing system 102 (see FIG. 1A) determines whether or not the detected LED code is 300. An LED code of 300 indicates that the AIX® kernel detects an unexpected Data Storage Interrupt caused by accessing an invalid memory address due to a previous function passing an invalid pointer. If the LED code is not 300, it may be another code such as 700. An LED code of 700 indicates that the AIX® kernel detects a "should not occur condition" (i.e., program interrupt) and then terminates itself via an assert( ) function. If step 368 determines that the LED code is not 300 (e.g., the LED code equals 700), then the next step is step 370. In step 370, computing system 102 (see FIG. 1A) stores five function names from the beginning of the stack trace into KeyStackWord[ ]. In step 372, computing system 102 (see FIG. 1A) registers KeyStackWord[ ], the release, version variable, KeyWordCnt=0, KeyStackCount=5, stack_scan_epth=5, and current_stack_only=true into symptom catalog 104 (see FIG. 1A) as a new symptom rule. The process of FIGS. 3A-3F ends at step 374.

Returning to step 368, if the detected LED code is equal to 300, then the next step is step 376. In step 376, computing system 102 (see FIG. 1A) stores five function names from the beginning of the stack trace into KeyStackWord[ ]. In step 378, computing system 102 (see FIG. 1A) registers KeyStackWord[ ], the release, version variable, KeyWordCnt=0, KeyStackCount=5, stack_scan_depth=5, and current_stack_only=true into symptom catalog 104 (see FIG. 1A) as a first new symptom rule. In step 380, computing system 102 (see FIG. 1A) stores five function names starting from the second line from the beginning of the stack trace into KeyStackWord[ ]. In step 382, computing system 102 (see FIG. 1A) registers KeyStackWord[ ], the release, version variable, KeyWordCnt=0, KeyStackCount=5, stack_scan_epth=6, and current_stack_only=true into symptom catalog 104 (see FIG. 1A) as a second new symptom rule.

Steps 376-382 require the generation and storage of two new symptom rules because the Data Storage Interrupt associated with the LED code of 300 may have occurred (1) at the function that immediately follows the function that passed the invalid pointer, or (2) at the second function following the function that passed the invalid pointer. A symptom corresponding to condition (1) is specified by the first new symptom rule generated and stored in steps 376 and 378. A symptom corresponding to condition (2) is specified by the second new symptom rule generated and stored in steps 380 and 382. After the completion of step 382, the process of FIGS. 3A-3F ends at step 374.

Figure 4A:
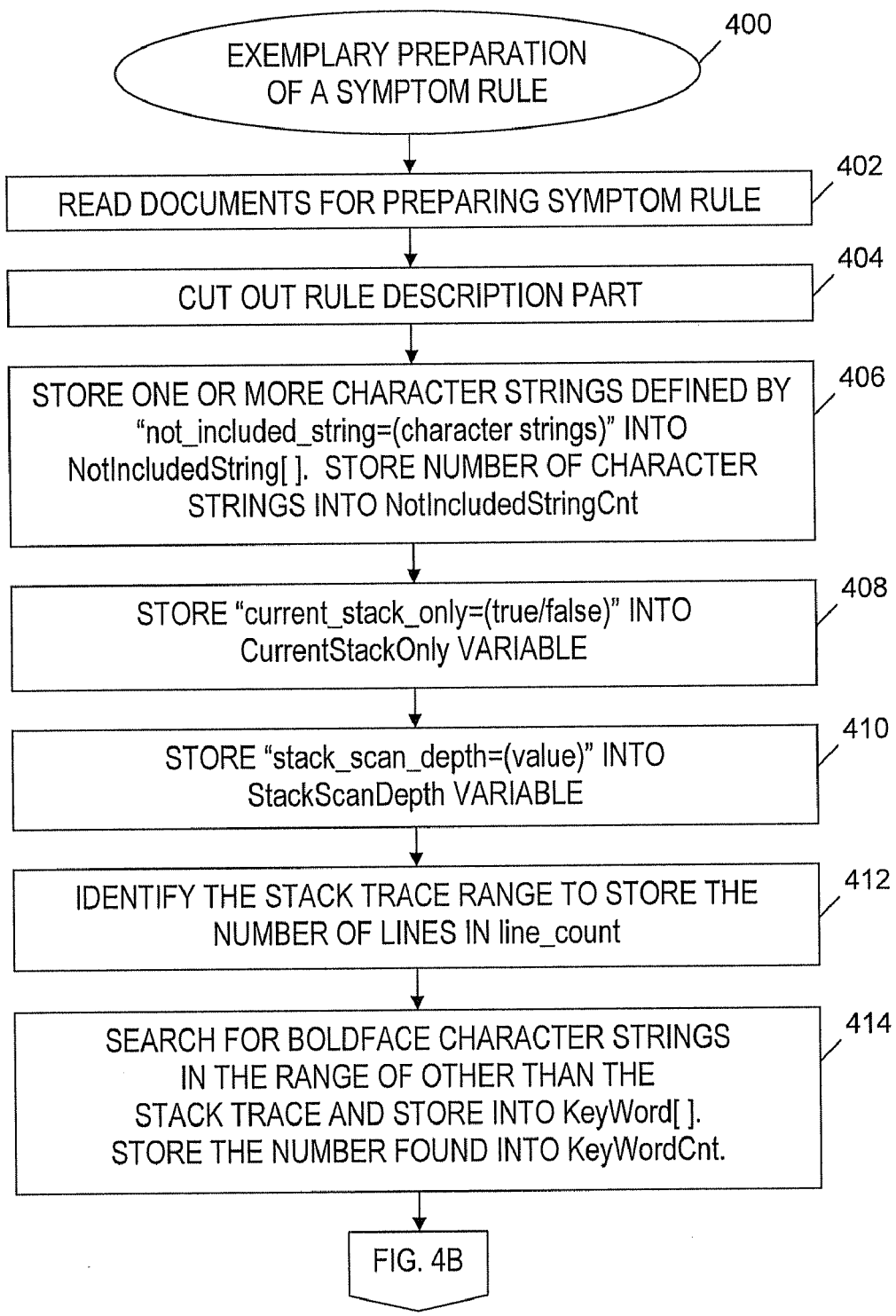
FIGS. 4A-4C depict a flowchart of a symptom rule preparation process that is an example of the process of FIG. 2B, in accordance with embodiments of the present invention.
Figure 4B:
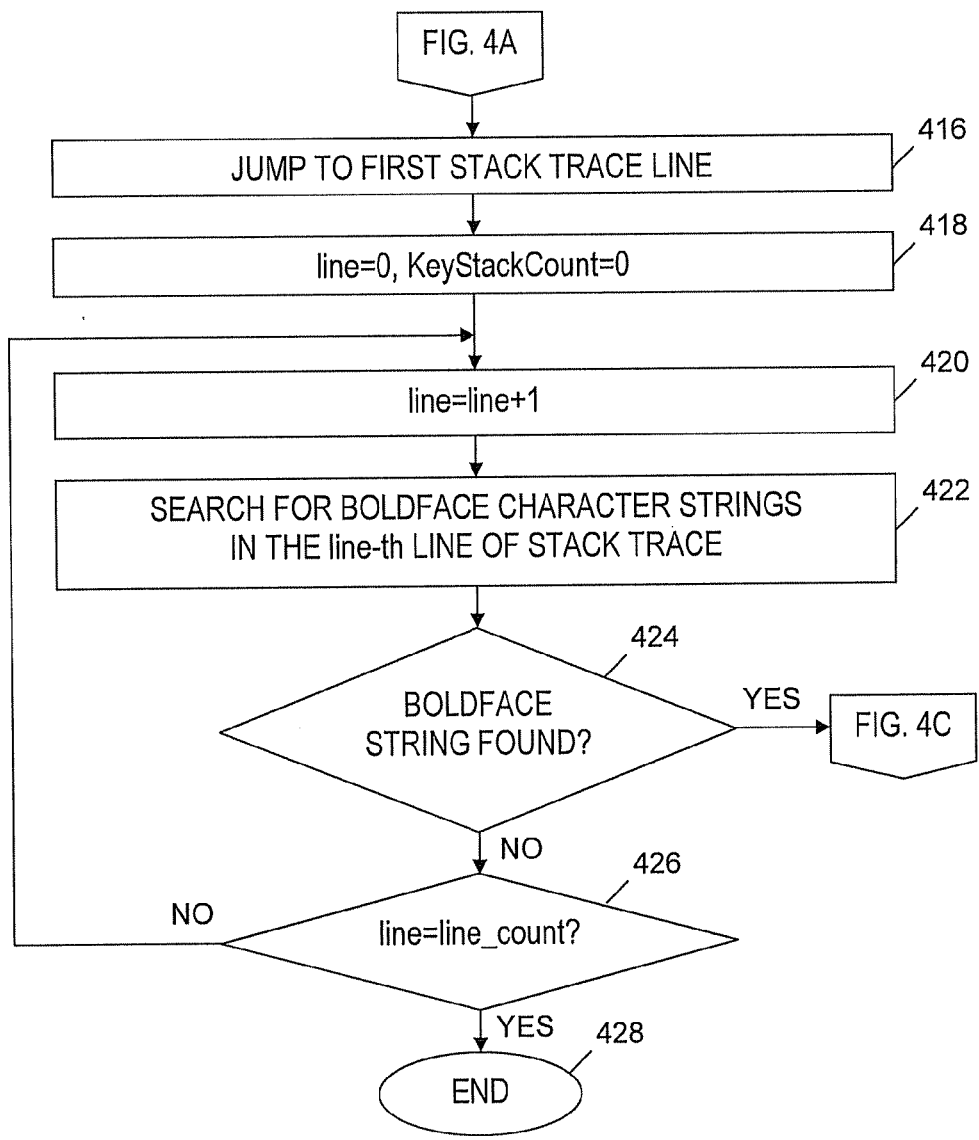
Figure 4C:
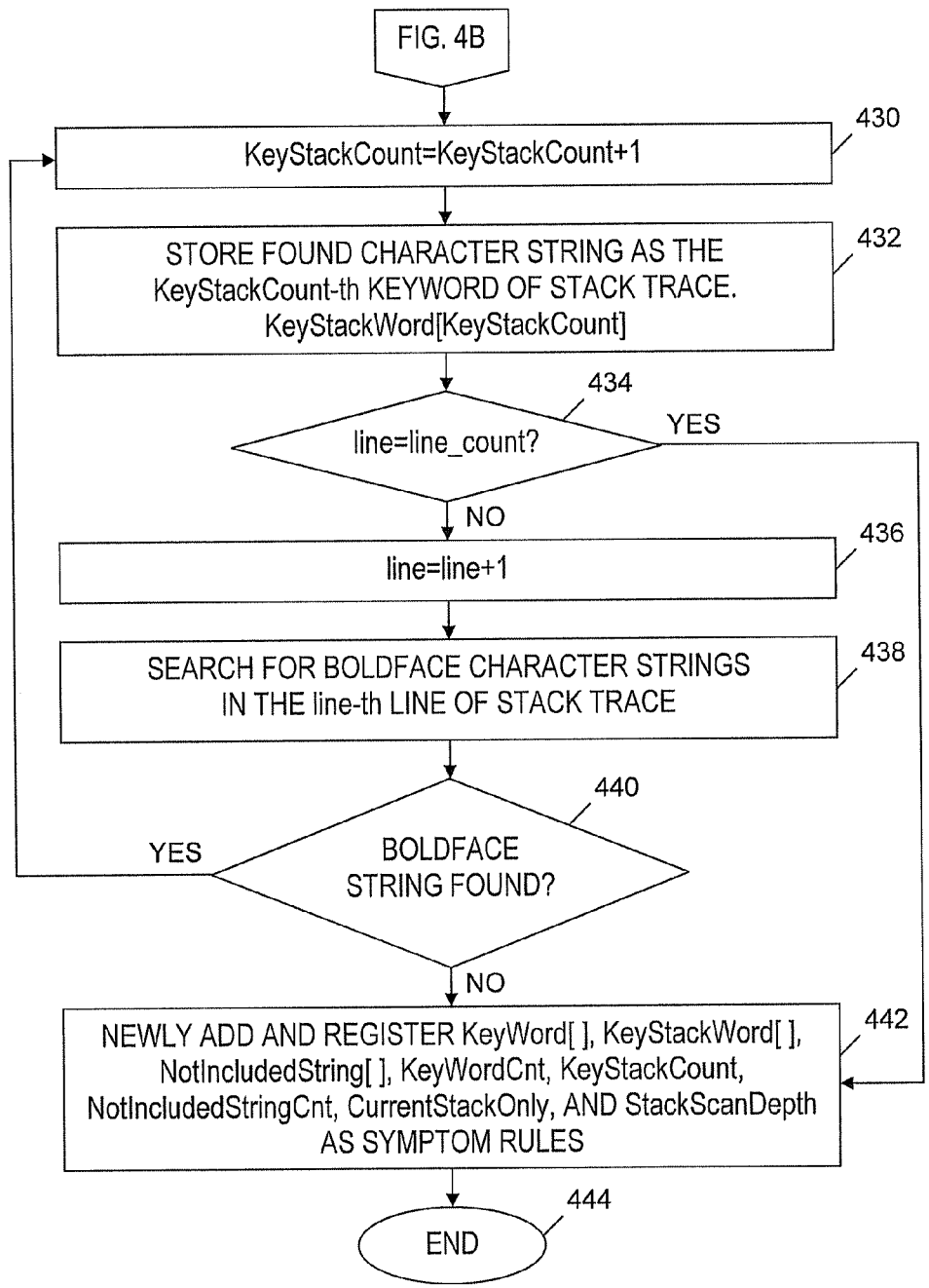

FIGS. 4A-4C depict a flowchart of a symptom rule preparation process that is an example of the process of FIG. 2B, in accordance with embodiments of the present invention. The symptom rule preparation process begins at step 400. In step 402, computing system 102 (see FIG. 1A) reads a document (e.g., Rich Text Format document) that specifies a symptom rule. In step 404, computing system 102 (see FIG. 1A) retrieves a symptom rule description part from the document read in step 402.

In step 406, computing system 102 (see FIG. 1A) stores one or more character strings defined by "not_included_tring=(character strings)" into NotIncludedString[ ]. NotIncludedString[ ] includes one or more character strings that are not to be included in the analysis of function names in step 206 (see FIG. 2A). Step 406 also includes the computing system 102 (see FIG. 1A) storing the number of character strings in NotIncludedString[ ] into NotIncludedStringCnt.

In step 408, computing system 102 (see FIG. 1A) stores the true or false value defined by "current_stack_only=(true/false)" into a CurrentStackOnly variable, which indicates whether the analysis of FIG. 2A for a particular symptom rule is performed only on a current stack trace or whether the analysis of FIG. 2A is also performed on one or more additional stack traces.

In step 410, computing system 102 (see FIG. 1A) stores the value defined by "stack_scan_depth=(value)" into a StackScanDepth variable, which indicates an ordinal position of a last line within a stack trace that is permitted to be analyzed in step 206 (see FIG. 2A) for a particular symptom rule (i.e., no stack trace lines in ordinal positions greater than the value of StackScanDepth are permitted to be analyzed in step 206 of FIG. 2A) for the particular symptom rule).

In step 412, computing system 102 (see FIG. 1A) identifies the range of lines of text in a stack trace (i.e., stack trace range) included in the document read in step 402 and stores the number of lines in the stack trace range in line_count. Hereinafter in the discussion of FIGS. 4A-4C, the stack trace included in the document read in step 402 is referred to simply as "the stack trace."

In step 414, computing system 102 (see FIG. 1A) searches for any boldface character strings in lines of text of the document read in step 402 that are not in the stack trace range. Also in step 414, computing system 102 (see FIG. 1A) stores any boldface character strings found in the aforementioned search into KeyWord[ ] and stores the number of boldface character strings found into KeyWordCnt.

After the completion of step 414, the exemplary symptom rule preparation process continues with step 416 of FIG. 4B. In step 416, computing system 102 (see FIG. 1A) accesses the first line of the stack trace. In step 418, computing system 102 (see FIG. 1A) initializes the variables line and KeyStackCount to zero. In step 420, computing system 102 (see FIG. 1A) increments the variable line by one. In step 422, computing system 102 (see FIG. 1A) searches for boldface character strings in the line-th line of the stack trace.

In step 424, computing system 102 (see FIG. 1A) determines whether a boldface string is found in the search performed in step 422. If a boldface string is found, the exemplary symptom rule preparation process continues with step 430 of FIG. 4C; otherwise, the next step is step 426. In step 426, computing system 102 (see FIG. 1A) compares line with line_count. If step 426 determines that line does not equal line_count, then the exemplary symptom rule preparation process repeats starting at step 420 (i.e., continue the search for boldface character strings at the next line of the stack trace); otherwise, the process of FIGS. 4A-4C ends at step 428.

In step 430 of FIG. 4C, which follows the finding of a boldface string in step 424 (see FIG. 4B), computing system 102 (see FIG. 1A) increments KeyStackCount by one. In step 432, computing system 102 (see FIG. 1A) stores the found boldface character string as the KeyStackCount-th keyword of the stack trace in KeyStackWord[KeyStackCount].

In step 434, computing system 102 (see FIG. 1A) compares line to line_count. If step 434 determines that line is not equal to line_count, then in step 436, computing system 102 (see FIG. 1A) increments line by one. In step 438, computing system 102 (see FIG. 1A) searches for any boldface character strings in the line-th line of the stack trace. In step 440, computing system 102 (see FIG. 1A) determines whether a boldface character string is found in the search performed in step 438. If step 440 determines that a boldface character string is not found, then the next step is step 442. In step 442, computing system 102 (see FIG. 1A) newly adds and registers KeyWord[ ], KeyStackWord[ ], NotIncludedString[ ], KeyWordCnt, KeyStackCount, NotIncludedStringCnt, CurrentStackOnly, and StackScanDepth as a symptom rule. After the completion of step 442, the process of FIGS. 4A-4C ends at step 444.

Returning to step 440, if a boldface character string is found, then the exemplary symptom rule preparation process repeats starting at step 430 (i.e., storing the found character string and continuing to search for more character strings starting with the next line of the stack trace).

Returning to step 434, if line is equal to line_count (i.e., Yes branch of step 434), then the exemplary symptom rule preparation process continues with step 442, as described above. In the case of taking the Yes branch of step 434, the search for boldface character strings is complete because the search has accessed all of the lines of the stack trace.

FIG. 5A is an example of an AIX® stack trace that is used as input to the system of FIG. 1A, in accordance with embodiments of the present invention. Example 500 includes a stack trace that is included in dump material or a log 110 (see FIG. 1A) provided by an AIX® operating system in response to an occurrence of a problem (e.g., system crash). Stack trace lines in example 500 start with "[" and end with ")". A function call starts from the procentry in the bottom stack trace line of example 500 and a problem is found in bmRecycle in the top stack trace line of example 500.

FIG. 5B is an example of a Linux stack trace that is used as input to the system of FIG. 1A, in accordance with embodiments of the present invention. Example 550 includes a stack trace that is included in dump material or a log 110 (see FIG. 1A) provided by a Linux operating system in response to an occurrence of a problem (e.g., system crash). Stack trace lines in example 550 follow the line that includes "Call Trace:". The function call starts from sysc_noemu in the second line from the bottom of example 550. A problem is found in kmem_cache_destroy in the third line from the top stack trace line of example 550.

FIGS. 6A-6B is an example of a record included in a component of FIG. 1B that is used in the process of FIG. 2B, in accordance with embodiments of the present invention. Record portion 600-1 (see FIG. 6A) is a first portion of a Lotus® Notes® database record included in database 154 (see FIG. 1B). Record portion 600-2 (see FIG. 6B) is a second portion of the Lotus® Notes® database record. Hereinafter, the Lotus® Notes® database record illustrated by FIGS. 6A-6B is referred to as record 600-1, 600-2. Symptom generator 150 (see FIG. 1B) prepares symptom catalog 104 (see FIG. 1B) by adding a tag of boldface type to keywords in record 600-1, 600-2, where the tagged keywords specify symptom of a problem. The keywords in record 600-1, 600-2 are extracted and converted into expressions that enable analysis engine 118 (see FIG. 1B) to match the keywords to function names in contiguous lines of a stack trace. In one embodiment, the keywords in record 600-1, 600-2 are extracted and converted to a logical language (e.g. JavaScript®).

FIG. 7 is an example of extracted symptom data used in the process of FIG. 2C, in accordance with embodiments of the present invention. Example 700 includes a stack trace and system status information. Example 700 includes boldface keywords that are extracted and stored in a new symptom rule to automatically generate a new symptom rule in the process of FIG. 2C in response to not finding any predetermined symptom rules that match function names in contiguous lines of a stack trace. The automatically generated new symptom rule is registered in symptom catalog 104 (see FIG. 1A) and is available to be matched against function names in contiguous stack trace lines in an analysis of a subsequent problem in the process of FIG. 2A.

FIG. 8 is an example of a report that is output from the system of FIG. 1A, where the output indicates the symptom data portion of the input to the system of FIG. 1A, in accordance with embodiments of the present invention. Report 800 is an example of output from system 100 (see FIG. 1A) that includes the input file (i.e., log 110 of FIG. 1A) that specifies symptom with recommendation 120 (see FIG. 1A). The boldface and italicized function names in report 800 (i.e., hd_pin_ot:hd_begin, hd_pin_bot:hd_parallel_write, hd_pin_bot:hd_ched_queue, hd_pin_bot:hd_strategy) specify a symptom of the problem being analyzed. The aforementioned boldface and italicized function names were also the function names in contiguous lines of a stack trace that were matched to a set of keywords in a symptom rule in step 206 (see FIG. 2A). The present invention contemplates output of system 100 (see FIG. 1A) may use any text attribute or combination of text attributes that emphasizes the symptom included in the input file.

Report 800 also includes a solution (i.e., Apply modification by PMR 12345, 678, 901) to the problem being analyzed. Report 800 is displayed on a display device for presentation to a user. The user that reads report 800 identifies which symptom part of the input file coincides with a symptom rule registered in symptom catalog 104 (see FIG. 1A). The user reading report 800 confirms the adaptability of the symptom include in the report to the problem being analyzed, so that recommended countermeasures can be securely deployed.

In one embodiment, output of system 100 (see FIG. 1A) may be one or more reports (e.g., report 800) that include multiple input files (i.e., multiple logs 110 of FIG. 1A; not shown in FIG. 8), where each input file includes one or more text attributes (e.g., boldface) to highlight the function names that specify a symptom of the problem being analyzed. Each of the multiple input files in the embodiment described in this paragraph is displayed in the one or more reports with a corresponding recommended solution to the problem.

In one embodiment, step 314 of FIG. 3A, step 318 of FIG. 3B, and steps 336 and 350 of FIG. 3D specify a part of the problem analysis process that is required to display report 800.

Computing System

Figure 9:
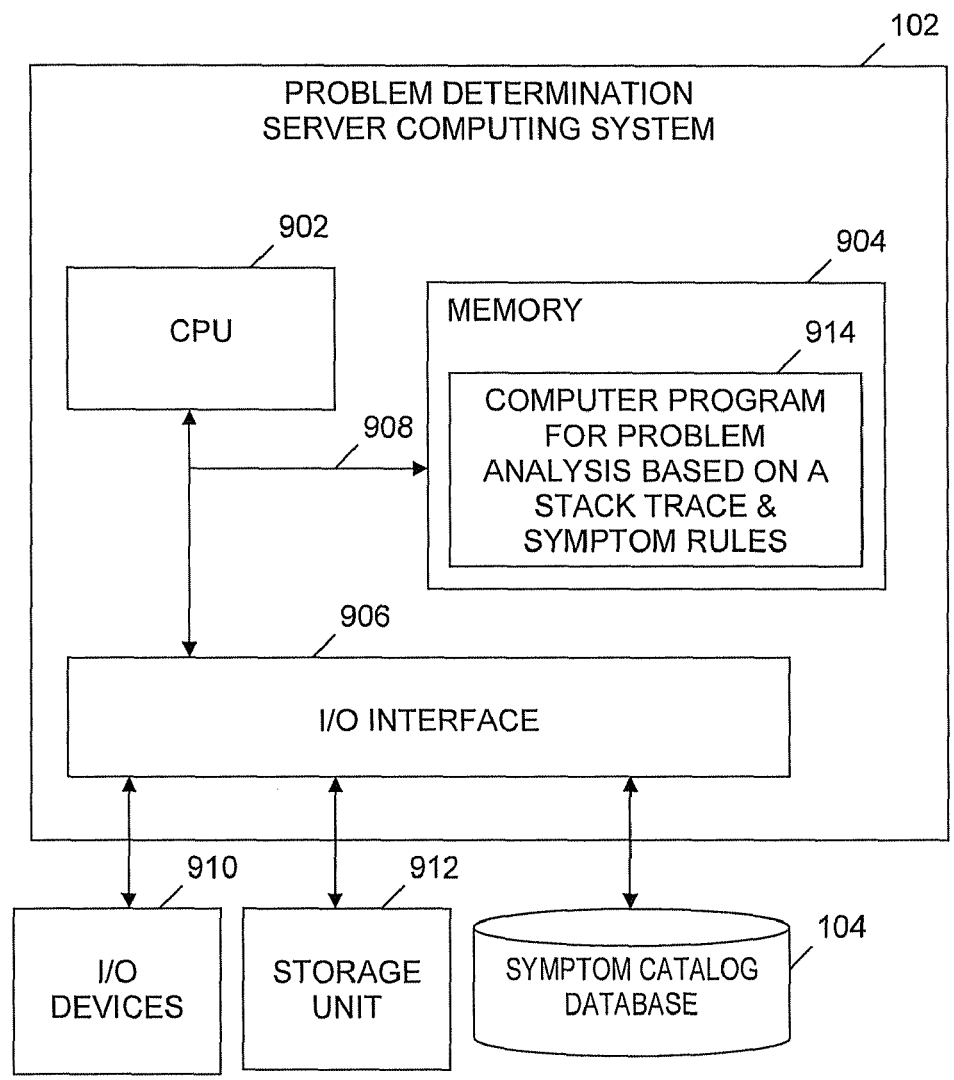
FIG. 9 is a block diagram of a computing system that is included in the system of FIG. 1A and that implements the processes of FIGS. 2A, 2B and 2C, in accordance with embodiments of the present invention.

FIG. 9 is a block diagram of a computing system that is included in the system of FIG. 1A and that implements the processes of FIGS. 2A, 2B and 2C, in accordance with embodiments of the present invention. Computing system 102 generally comprises a central processing unit (CPU) 902, a memory 904, an input/output (I/O) interface 906, and a bus 908. Further, computing system 102 is coupled to I/O devices 910, a computer data storage unit 912, and symptom catalog database 104. CPU 902 performs computation and control functions of computing system 102. CPU 902 may comprise a single processing unit, or be distributed across one or more processing units in one or more locations (e.g., on a client and server).

Memory 904 may comprise any known type of computer data storage and/or transmission media, including bulk storage, magnetic media, optical media, random access memory (RAM), read-only memory (ROM), a data cache, a data object, etc. In one embodiment, cache memory elements of memory 904 provide temporary storage of at least some program code in order to reduce the number of times code must be retrieved from bulk storage during execution. Moreover, similar to CPU 902, memory 904 may reside at a single physical location, comprising one or more types of data storage, or be distributed across a plurality of physical systems in various forms. Further, memory 904 can include data distributed across, for example, a local area network (LAN) or a wide area network (WAN).

I/O interface 906 comprises any system for exchanging information to or from an external source. I/O devices 910 comprise any known type of external device, including a display device (e.g., monitor), keyboard, mouse, printer, speakers, handheld device, facsimile, etc. Bus 908 provides a communication link between each of the components in computing system 102, and may comprise any type of transmission link, including electrical, optical, wireless, etc.

I/O interface 906 also allows computing system 102 to store and retrieve information (e.g., data or program instructions such as code 914) from an auxiliary storage device such as computer data storage unit 912 or another computer data storage unit (not shown). Computer data storage unit 912 may be a non-volatile storage device, such as a magnetic disk drive (i.e., hard disk drive) or an optical disc drive (e.g., a CD-ROM drive which receives a CD-ROM disk). Symptom catalog database 104 may reside in computer data storage unit 912 or in another computer data storage unit (not shown).

Memory 904 includes computer program code 914 that provides the logic for analyzing a problem based on a stack trace and symptom rules stored in symptom catalog database 104 (e.g., the process of FIG. 2A), preparing a symptom rule (e.g., the process of FIG. 2B), and automatically generating a new symptom rule (e.g., the process of FIG. 2C). Further, memory 904 may include other systems not shown in FIG. 9, such as an operating system (e.g., Linux) that runs on CPU 902 and provides control of various components within and/or connected to computing system 102.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 of FIG. 1A or computing system 102). Furthermore, the present invention may take the form of a computer program product embodied in any tangible medium of expression (e.g., memory 904 or computer data storage unit 912) having computer-usable program code (e.g., code 914) embodied in the medium.

Any combination of one or more computer-usable or computer-readable medium(s) (e.g., memory 904 and computer data storage unit 912) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read only memory (CD-ROM), an optical storage device, a transmission media such as those supporting the Internet or an intranet, or a magnetic storage device. Note that the computer-usable or computer-readable medium could even be paper or another suitable medium upon which the program 914 is printed, as the program 914 can be electronically captured via, for instance, optical scanning of the paper or other medium, then compiled, interpreted, or otherwise processed in a suitable manner, if necessary, and then stored in a computer memory 904.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 914) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 102), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2A-2C, FIGS. 3A-3F and FIGS. 4A-4C) and/or block diagrams of methods, apparatus (systems) (e.g., FIG. 1A, FIG. 1B and FIG. 9), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 914). These computer program instructions may be provided to a processor (e.g., CPU 902) of a general purpose computer (e.g., computing system 102), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 904 or computer data storage unit 912) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of analyzing a problem based on a stack trace and symptom rules, preparing a symptom rule, and/or automatically generating a new symptom rule. Thus, the present invention discloses a process for supporting computer infrastructure, comprising integrating, hosting, maintaining and deploying computer-readable code (e.g., code 914) into a computing system (e.g., computing system 102), wherein the code in combination with the computing system is capable of performing a method of analyzing a problem based on a stack trace and symptom rules, preparing a symptom rule, and/or automatically generating a new symptom rule.

In another embodiment, the invention provides a business method that performs the process steps of the invention on a subscription, advertising and/or fee basis. That is, a service provider, such as a Solution Integrator, can offer to create, maintain, support, etc. a method of analyzing a problem based on a stack trace and symptom rules stored in symptom catalog database 104, preparing a symptom rule, and/or automatically generating a new symptom rule. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2C, FIGS. 3A-3F and FIGS. 4A-4C, and the block diagrams in FIG. 1A, FIG. 1B and FIG. 9 illustrate the architecture, functionality, and operation of possible implementations of systems, methods, and computer program products according to various embodiments of the present invention. In this regard, each block in the flowchart or block diagrams may represent a module, segment, or portion of code (e.g., code 914), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of analyzing a problem in a computing environment, comprising:

generating, by a computing system, a plurality of symptom rules in a symptom catalog that includes a plurality of sets of information (problem information) about a plurality of problems, wherein said plurality of symptom rules includes a plurality of sets of keywords, wherein said symptom catalog associates said sets of keywords to said sets of problem information in a one-to-one correspondence, and wherein said generating said plurality of symptom rules includes:

receiving a document that includes a plurality of tagged keywords included in a prior stack trace, wherein said plurality of tagged keywords indicate said problem;

identifying a range of lines in said document, wherein said range of lines indicates said prior stack trace;
identifying said plurality of tagged keywords in a set of contiguous lines within said range of lines;
extracting said plurality of tagged keywords from said set of contiguous lines;
in response to said extracting, converting said plurality of tagged keywords into a plurality of expressions that facilitate said matching; and
subsequent to said converting, storing said plurality of expressions in a symptom rule of said plurality of symptom rules residing in a computer data storage device;
receiving, by said computing system, an input file that includes a stack trace provided in response to a detection of said problem;
identifying, by said computing system, a set of function names included in a plurality of contiguous lines in said stack trace;
searching, by said computing system, said symptom catalog for said set of function names;
matching, by said computing system and in response to said searching, said set of function names to a set of keywords of said plurality of sets of keywords;
retrieving, by said computing system, a set of problem information of said plurality of sets of problem information, wherein said set of problem information corresponds to said set of keywords and includes a solution to said problem; and
generating, by said computing system, a report that includes said stack trace and said solution, wherein said report displays said set of function names included in said stack trace in a text having at least one attribute that emphasizes said text.

2. The method of claim 1, wherein said document is a document in Rich Text Format.

3. The method of claim 1, wherein each tagged keyword of said plurality of tagged keywords includes a tag indicating a bold typeface.

4. The method of claim 1, further comprising:
receiving, by said computing system, a second input file that includes a second stack trace provided in response to a detection of a second problem, wherein said second stack trace includes multiple sets of function names included in multiple sets of contiguous lines included in said second stack trace;
determining, by said computing system, that no set of function names of said multiple sets of function names match any set of keywords of said plurality of sets of keywords;
determining, by said computing system, that a problem code in said second input file indicates that a new symptom rule can be generated for said second problem;
identifying, by said computing system and based on said problem code, a first new set of function names of said multiple sets of function names, wherein said first new set of function names is included in a first set of contiguous lines of said multiple sets of contiguous lines, and wherein said first new set of function names indicates a first symptom of said second problem; and
storing, by said computing system, said first new set of function names in a first new symptom rule in said symptom catalog.

5. The method of claim 4, wherein said receiving said second input file includes receiving a log file derived from a system dump provided by an Advanced Interactive eXecutive (AIX) operating system, wherein said determining that said problem code indicates that a new symptom rule can be generated includes determining that said log file includes a light-emitting diode (LED) code provided by a kernel of said AIX operating system, and wherein said problem code is said LED code.

6. The method of claim 5, further comprising determining that said LED code indicates that said second problem is other than a data storage interrupt caused by an access of an invalid memory address via a passing of an invalid pointer, wherein said identifying said first new set of function names includes identifying five function names included in five contiguous lines that start at a first line of said second stack trace included in said second input file, and wherein said storing said first new set of function names in said first new symptom rule includes storing said five function names in said first new symptom rule.

7. The method of claim 5, further comprising determining that said LED code indicates that said second problem is a data storage interrupt caused by an access of an invalid memory address via a passing of an invalid pointer, wherein said identifying said first new set of function names includes identifying a first set of five function names included in a first set of five contiguous lines that start at a first line of said second stack trace included in said second input file, wherein said storing said first new set of function names in said first new symptom rule includes storing said first set of five function names in said first new symptom rule, and wherein said method still further comprises:
identifying a second set of five function names as a second new set of function names of said multiple sets of function names, wherein said second set of five function names is included in a second set of five contiguous lines included in said multiple sets of contiguous lines, and wherein said second set of five contiguous lines start at a second line of said second stack trace included in said second input file; and
storing said second set of five function names in a second new symptom rule in said symptom catalog, wherein said first set of five function names is different from said second set of five function names.

8. A computing system comprising a processor coupled to a computer-readable memory unit, said memory unit comprising a software application, said software application comprising instructions that when executed by said processor implement the method of claim 1.

9. A computer program product, comprising a computer readable storage medium having a computer readable program code stored therein, said computer readable program code containing instructions configured to be executed by a processor of a computer system to implement a method of analyzing a problem in a computing environment, said method comprising:
generating, by a computing system, a plurality of symptom rules in a symptom catalog that includes a plurality of sets of information (problem information) about a plurality of problems, wherein said plurality of symptom rules includes a plurality of sets of keywords, wherein said symptom catalog associates said sets of keywords to said sets of problem information in a one-to-one correspondence, and wherein said generating said plurality of symptom rules includes:
receiving a document that includes a plurality of tagged keywords included in a prior stack trace, wherein said plurality of tagged keywords indicate said problem;
identifying a range of lines in said document, wherein said range of lines indicates said prior stack trace;

identifying said plurality of tagged keywords in a set of contiguous lines within said range of lines;

extracting said plurality of tagged keywords from said set of contiguous lines;

in response to said extracting, converting said plurality of tagged keywords into a plurality of expressions that facilitate said matching; and subsequent to said converting, storing said plurality of expressions in a symptom rule of said plurality of symptom rules residing in a computer data storage device;

receiving, by said computing system, an input file that includes a stack trace provided in response to a detection of said problem;

identifying, by said computing system, a set of function names included in a plurality of contiguous lines in said stack trace;

searching, by said computing system, said symptom catalog for said set of function names;

matching, by said computing system and in response to said searching, said set of function names to a set of keywords of said plurality of sets of keywords;

retrieving, by said computing system, a set of problem information of said plurality of sets of problem information, wherein said set of problem information corresponds to said set of keywords and includes a solution to said problem; and generating, by said computing system, a report that includes said stack trace and said solution, wherein said report displays said set of function names included in said stack trace in a text having at least one attribute that emphasizes said text.

10. The program product of claim 9, wherein said document is a document in Rich Text Format.

11. The program product of claim 9, wherein each tagged keyword of said plurality of tagged keywords includes a tag indicating a bold typeface.

12. The program product of claim 9, wherein said method further comprises:

receiving, by said computing system, a second input file that includes a second stack trace provided in response to a detection of a second problem, wherein said second stack trace includes multiple sets of function names included in multiple sets of contiguous lines included in said second stack trace;

determining, by said computing system, that no set of function names of said multiple sets of function names match any set of keywords of said plurality of sets of keywords;

determining, by said computing system, that a problem code in said second input file indicates that a new symptom rule can be generated for said second problem;

identifying, by said computing system and based on said problem code, a first new set of function names of said multiple sets of function names, wherein said first new set of function names is included in a first set of contiguous lines of said multiple sets of contiguous lines, and wherein said first new set of function names indicates a first symptom of said second problem; and storing, by said computing system, said first new set of function names in a first new symptom rule in said symptom catalog.

13. The program product of claim 12, wherein said receiving said second input file includes receiving a log file derived from a system dump of an Advanced Interactive eXecutive (AIX) operating system, wherein said determining that said problem code indicates that a new symptom rule can be generated includes determining that said log file includes a light-emitting diode (LED) code provided by a kernel of said AIX operating system, and wherein said problem code is said LED code.

14. The program product of claim 13, wherein said method further comprises determining that said LED code indicates that said second problem is other than a data storage interrupt caused by an access of an invalid memory address via a passing of an invalid pointer, wherein said identifying said first new set of function names includes identifying five function names included in five contiguous lines that start at a first line of said second stack trace included in said second input file, and wherein said storing said first new set of function names in said first new symptom rule includes storing said five function names in said first new symptom rule.

15. The program product of claim 13, wherein said method further comprises determining that said LED code indicates that said second problem is a data storage interrupt caused by an access of an invalid memory address via a passing of an invalid pointer, wherein said identifying said first new set of function names includes identifying a first set of five function names included in a first set of five contiguous lines that start at a first line of said second stack trace included in said second input file, wherein said storing said first new set of function names in said first new symptom rule includes storing said first set of five function names in said first new symptom rule, and wherein said method still further comprises:

identifying a second set of five function names as a second new set of function names of said multiple sets of function names, wherein said second set of five function names is included in a second set of five contiguous lines included in said multiple sets of contiguous lines, and wherein said second set of five contiguous lines start at a second line of said second stack trace included in said second input file; and storing said second set of five function names in a second new symptom rule in said symptom catalog, wherein said first set of five function names is different from said second set of five function names.

16. A process for supporting computing infrastructure, said process comprising providing at least one support service for at least one of creating, integrating, hosting, maintaining, and deploying computer-readable code in a computing system, wherein the code in combination with the computing system is capable of performing a method of analyzing a problem in a computing environment, said method comprising:

generating, by a computing system, a plurality of symptom rules in a symptom catalog that includes a plurality of sets of information (problem information) about a plurality of problems, wherein said plurality of symptom rules includes a plurality of sets of keywords, wherein said symptom catalog associates said sets of keywords to said sets of problem information in a one-to-one correspondence, and wherein said generating said plurality of symptom rules includes:

receiving a document that includes a plurality of tagged keywords included in a prior stack trace, wherein said plurality of tagged keywords indicate said problem;

identifying a range of lines in said document, wherein said range of lines indicates said prior stack trace;

identifying said plurality of tagged keywords in a set of contiguous lines within said range of lines;

extracting said plurality of tagged keywords from said set of contiguous lines;

in response to said extracting, converting said plurality of tagged keywords into a plurality of expressions that facilitate said matching; and subsequent to said converting, storing said plurality of expressions in a symptom rule of said plurality of symptom rules residing in a computer data storage device;

receiving, by said computing system, an input file that includes a stack trace provided in response to a detection of said problem;

identifying, by said computing system, a set of function names included in a plurality of contiguous lines in said stack trace;

searching, by said computing system, said symptom catalog for said set of function names;

matching, by said computing system and in response to said searching, said set of function names to a set of keywords of said plurality of sets of keywords;

retrieving, by said computing system, a set of problem information of said plurality of sets of problem information, wherein said set of problem information corresponds to said set of keywords and includes a solution to said problem; and generating, by said computing system, a report that includes said stack trace and said solution, wherein said report displays said set of function names included in said stack trace in a text having at least one attribute that emphasizes said text.

17. The process of claim 16, wherein said document is a document in Rich Text Format.

* * * * *